United States Patent
Walker et al.

(10) Patent No.: US 11,385,616 B2
(45) Date of Patent: Jul. 12, 2022

(54) MAXIMUM FORCE LOGGING AND OPERATIONAL PERFORMANCE PROGNOSTICS FOR PROCESS CONTROL DEVICES

(71) Applicant: Emerson Process Management Valve Automation, Inc., Houston, TX (US)

(72) Inventors: Paul Walker, Houston, TX (US); Mahesh Gade, Richmond, TX (US)

(73) Assignee: EMERSON PROCESS MANAGEMENT VALVE AUTOMATION, INC., Houston, TX (US)

( * ) Notice: Subject to any disclaimer, the term of this patent is extended or adjusted under 35 U.S.C. 154(b) by 745 days.

(21) Appl. No.: 16/125,160

(22) Filed: Sep. 7, 2018

(65) Prior Publication Data

US 2020/0081410 A1    Mar. 12, 2020

(51) Int. Cl.
*G05B 19/406* (2006.01)

(52) U.S. Cl.
CPC .. *G05B 19/406* (2013.01); *G05B 2219/41303* (2013.01)

(58) Field of Classification Search
CPC .............. G05B 23/0232; G05B 19/406; F16K 37/0083; A61M 39/22; F15B 21/087
See application file for complete search history.

(56) References Cited

U.S. PATENT DOCUMENTS

| | | | |
|---|---|---|---|
| 7,478,012 B2 * | 1/2009 | Tewes ................ | G05B 23/0232 702/183 |
| 7,539,549 B1 | 5/2009 | Discenzo et al. | |
| 2003/0042861 A1 | 3/2003 | Schwartz et al. | |
| 2012/0259467 A1 | 10/2012 | Bell et al. | |
| 2013/0047745 A1 | 2/2013 | Vidal | |

(Continued)

FOREIGN PATENT DOCUMENTS

JP    H04185983 A    7/1992

OTHER PUBLICATIONS

Richard D.Oaks "Fundamentals of Electric Actuator Control" (Year: 2006).*

(Continued)

*Primary Examiner* — Andrew Schechter
*Assistant Examiner* — Kaleria Knox
(74) *Attorney, Agent, or Firm* — Marshall, Gerstein & Borun LLP

(57) ABSTRACT

An actuator of a process control device continuously monitors actuator force and records high force values at each position point by continuously executing a routine in a processor of the actuator. The routine includes receiving from a position sensor a current position value indicating a position of a valve element in the valve, and from a force sensor a current force value indicating a force applied by the actuator. The routine also includes retrieving, from a memory device coupled to the processor, a previous force value measured at the current position, and comparing the current force values for the current position with the previous force value for the current position. If the current force value for the current position exceeds the previous force value for the current position, the routine replaces the previous force value for the current position with the current force value for the current position in memory.

20 Claims, 12 Drawing Sheets

(56) References Cited

U.S. PATENT DOCUMENTS

| | | | |
|---|---|---|---|
| 2013/0110418 A1* | 5/2013 | Nousiainen | F16K 37/0083 |
| | | | 702/50 |
| 2015/0129055 A1* | 5/2015 | Byler | A61M 39/22 |
| | | | 137/487.5 |
| 2017/0184215 A1* | 6/2017 | Junk | F15B 21/087 |
| 2020/0007011 A1 | 1/2020 | Doglio et al. | |

OTHER PUBLICATIONS

International Search Report issued in PCT Patent Application No. PCT/US2019/046836 dated Nov. 8, 2019.
Written Opinion issued in PCT Patent Application No. PCT/US2019/046836 dated Nov. 8, 2019.

* cited by examiner

|         | 208 FST | 210     | 212 PST | 214    |
|---------|---------|---------|---------|--------|
| Position | OPEN   | CLOSE   | OPEN    | CLOSE  |
| 0       | 70      | 70      | 70      | 70     |
| 1       | 66      | 66      | 66      | 66     |
| 2       | 62      | 62      | 62      | 62     |
| 3       | 58      | 59      | 58      | 59     |
| 4       | 54      | 55      | 54      | 55     |
| 5       | 50      | 52      | 50      | 52     |
| 6       | 46      | 48      | 46      | 48     |
| 7       | 42      | 46      | 42      | 46     |
| 8       | 38      | 42      | 38      | 42     |
| 9       | 34      | 38      | 34      | 38     |
| 10      | 30      | 33      | 30      | 33     |
| ...     | ...     | ...     | ...     | ...    |
| 26      | 28      | 33      | 28      | 33     |
| 27      | 28      | 33      | 28      | 33     |
| 28      | 28      | 33      | 28      | 33     |
| 29      | 28      | 33      | 28      | 33     |
| 30      | 28      | 33      | 28      | 33     |
| ...     | ...     | ...     |         |        |
| 91      | 42      | 48      |         |        |
| 92      | 43      | 49      |         |        |
| 93      | 44      | 50      |         |        |
| 94      | 45      | 50      |         |        |
| 95      | 46      | 51      |         |        |
| 96      | 47      | 52      |         |        |
| 97      | 48      | 53      |         |        |
| 98      | 49      | 53      |         |        |
| 99      | 50      | 54      |         |        |
| 100     | 51      | 55      |         |        |

*FIG. 2C*

| 400 | 402 PST OPEN | | | 404 PST CLOSE | | | 406 PST OPEN | | | 408 PST CLOSE | | |
|---|---|---|---|---|---|---|---|---|---|---|---|---|
| Position | Force | Time | Op Srce | Force | Time | Op Srce | Force | Time | Op Srce | Force | Time | Op Srce |
| 0 | 70 | 20180720131530400 | AMS | 70 | 20180720131318200 | AMS | 70 | 20180728154513400 | AMS | 70 | 20180724154546300 | AMS |
| 1 | 66 | 20180720131530500 | AMS | 66 | 20180720131318240 | AMS | 66 | 20180728154513500 | AMS | 66 | 20180724154546140 | AMS |
| 2 | 62 | 20180720131530600 | AMS | 62 | 20180720131318230 | AMS | 62 | 20180728154513600 | AMS | 62 | 20180724154546130 | AMS |
| 3 | 58 | 20180720131530700 | AMS | 59 | 20180720131318220 | AMS | 58 | 20180728154513700 | AMS | 59 | 20180724154546120 | AMS |
| 4 | 54 | 20180720131530800 | AMS | 55 | 20180720131318210 | AMS | 54 | 20180728154513800 | AMS | 55 | 20180724154546110 | AMS |
| 5 | 50 | 20180720131530900 | AMS | 52 | 20180720131318200 | AMS | 50 | 20180728154513900 | AMS | 52 | 20180724154546100 | AMS |
| 6 | 46 | 20180720131531000 | AMS | 48 | 20180720131318190 | AMS | 46 | 20180728154514000 | AMS | 48 | 20180724154546090 | AMS |
| 7 | 42 | 20180720131531100 | AMS | 46 | 20180720131318180 | AMS | 42 | 20180728154514100 | AMS | 46 | 20180724154546080 | AMS |
| 8 | 38 | 20180720131531200 | AMS | 42 | 20180720131318170 | AMS | 38 | 20180728154514200 | AMS | 42 | 20180724154546070 | AMS |
| 9 | 34 | 20180720131531300 | AMS | 38 | 20180720131318160 | AMS | 34 | 20180728154514300 | AMS | 38 | 20180724154546060 | AMS |
| 10 | 30 | 20180720131531400 | AMS | 33 | 20180720131318150 | AMS | 30 | 20180728154514400 | AMS | 33 | 20180724154546050 | AMS |
| ... | . | . | . | . | . | . | . | . | . | . | . | . |
| 26 | 28 | 20180720131533000 | AMS | 33 | 20180720131317590 | AMS | 28 | 20180724154514000 | AMS | 33 | 20180724154548900 | AMS |
| 27 | 28 | 20180720131533100 | AMS | 33 | 20180720131317580 | AMS | 28 | 20180724154514100 | AMS | 33 | 20180724154548800 | AMS |
| 28 | 28 | 20180720131533200 | AMS | 33 | 20180720131317570 | AMS | 28 | 20180724154514200 | AMS | 33 | 20180724154548700 | AMS |
| 29 | 28 | 20180720131533300 | AMS | 33 | 20180720131317560 | AMS | 28 | 20180724154514300 | AMS | 33 | 20180724154548600 | AMS |
| 30 | 28 | 20180720131533400 | AMS | 33 | 20180720131317550 | AMS | 28 | 20180724154514400 | AMS | 33 | 20180724154548500 | AMS |
| ... | . | . | . | . | . | . | | | | | | |
| 91 | 42 | 20180720131633500 | AMS | 48 | 20180720131316540 | AMS | | | | | | |
| 92 | 43 | 20180720131633600 | AMS | 49 | 20180720131316530 | AMS | | | | | | |
| 93 | 44 | 20180720131633700 | AMS | 50 | 20180720131316520 | AMS | | | | | | |
| 94 | 45 | 20180720131633800 | AMS | 50 | 20180720131316510 | AMS | | | | | | |
| 95 | 46 | 20180720131633900 | AMS | 51 | 20180720131316500 | AMS | | | | | | |
| 96 | 47 | 20180720131634000 | AMS | 52 | 20180720131316490 | AMS | | | | | | |
| 97 | 48 | 20180720131634100 | AMS | 53 | 20180720131316480 | AMS | | | | | | |
| 98 | 49 | 20180720131634200 | AMS | 53 | 20180720131316470 | AMS | | | | | | |
| 99 | 50 | 20180720131634300 | AMS | 54 | 20180720131316460 | AMS | | | | | | |
| 100 | 51 | 20180720131634400 | AMS | 55 | 20180720131316450 | AMS | | | | | | |

*FIG. 4A*

| | | HIGH-WATER OPEN | | | | HIGH-WATER CLOSE | | |
|---|---|---|---|---|---|---|---|---|
| Position | Force | Time | Op | Op Srce | Force | Time | Op | Op Srce |
| 0 | 70 | 2018072013150400 | FST | AMS | 70 | 2018072013182500 | FST | AMS |
| 1 | 66 | 2018072013150500 | FST | AMS | 66 | 2018072013182400 | FST | AMS |
| 2 | 62 | 2018072013150600 | FST | AMS | 62 | 2018072013182300 | FST | AMS |
| 3 | 58 | 2018072013150700 | FST | AMS | 59 | 2018072013182200 | FST | AMS |
| 4 | 54 | 2018072013150800 | FST | AMS | 55 | 2018072013182100 | FST | AMS |
| 5 | 50 | 2018072013150900 | FST | AMS | 52 | 2018072013182000 | FST | AMS |
| 6 | 46 | 2018072013151000 | FST | AMS | 48 | 2018072013181900 | FST | AMS |
| 7 | 42 | 2018072013151100 | FST | AMS | 46 | 2018072013181800 | FST | AMS |
| 8 | 38 | 2018072013151200 | FST | AMS | 42 | 2018072013181700 | FST | AMS |
| 9 | 34 | 2018072013151300 | FST | AMS | 38 | 2018072013181600 | FST | AMS |
| 10 | 30 | 2018072013151400 | FST | AMS | 33 | 2018072013181500 | FST | AMS |
| 11 | 29 | 2018072013151500 | FST | AMS | 33 | 2018072013181400 | FST | AMS |
| 12 | 28 | 2018072013151600 | FST | AMS | 33 | 2018072013181300 | FST | AMS |
| 13 | 28 | 2018072013151700 | FST | AMS | 33 | 2018072013181200 | FST | AMS |
| 14 | 28 | 2018072013151800 | FST | AMS | 33 | 2018072013181100 | FST | AMS |
| 15 | 28 | 2018072013151900 | FST | AMS | 33 | 2018072013181000 | FST | AMS |
| 16 | 28 | 2018072013152000 | FST | AMS | 33 | 2018072013180900 | FST | AMS |
| 17 | 28 | 2018072013152100 | FST | AMS | 33 | 2018072013180800 | FST | AMS |
| 18 | 28 | 2018072013152200 | FST | AMS | 33 | 2018072013180700 | FST | AMS |
| 19 | 28 | 2018072013152300 | FST | AMS | 33 | 2018072013180600 | FST | AMS |
| 20 | 28 | 2018072013152400 | FST | AMS | 33 | 2018072013180500 | FST | AMS |
| 21 | 29 | 2018072620081600 | NORM | CTRLR | 33 | 2018072013180400 | FST | AMS |
| 22 | 29 | 2018072620081700 | NORM | CTRLR | 33 | 2018072013180300 | FST | AMS |
| 23 | 29 | 2018072620081800 | NORM | CTRLR | 33 | 2018072013180200 | FST | AMS |
| 24 | 29 | 2018072620081900 | NORM | CTRLR | 33 | 2018072013180100 | FST | AMS |
| 25 | 29 | 2018072620082000 | NORM | CTRLR | 33 | 2018072013180000 | FST | AMS |
| 26 | 29 | 2018072620082100 | NORM | CTRLR | 33 | 2018072013175900 | FST | AMS |
| 27 | 29 | 2018072620082200 | NORM | CTRLR | 35 | 2018072419205400 | NORM | CTRLR |
| 28 | 29 | 2018072620082300 | NORM | CTRLR | 35 | 2018072419205300 | NORM | CTRLR |
| 29 | 29 | 2018072620082400 | NORM | CTRLR | 35 | 2018072419205200 | NORM | CTRLR |
| 30 | 29 | 2018072620082500 | NORM | CTRLR | 35 | 2018072419205100 | NORM | CTRLR |
| 31 | 29 | 2018072620082600 | NORM | CTRLR | 35 | 2018072419205000 | NORM | CTRLR |
| 32 | 28 | 2018072013153600 | FST | AMS | 35 | 2018072419204900 | NORM | CTRLR |
| 33 | 28 | 2018072013153700 | FST | AMS | 35 | 2018072419204800 | NORM | CTRLR |
| 34 | 28 | 2018072013153800 | FST | AMS | 35 | 2018072419204700 | NORM | CTRLR |
| 35 | 28 | 2018072013153900 | FST | AMS | 35 | 2018072419204600 | NORM | CTRLR |
| 36 | 28 | 2018072013154000 | FST | AMS | 35 | 2018072419204500 | NORM | CTRLR |
| 37 | 28 | 2018072013154100 | FST | AMS | 35 | 2018072419204400 | NORM | CTRLR |
| 38 | 28 | 2018072013154200 | FST | AMS | 35 | 2018072419204300 | NORM | CTRLR |
| 39 | 28 | 2018072013154300 | FST | AMS | 34 | 2018072419204200 | NORM | CTRLR |
| 40 | 28 | 2018072013154400 | FST | AMS | 33 | 2018072013174500 | FST | AMS |
| 41 | 28 | 2018072013154500 | FST | AMS | 33 | 2018072013174400 | FST | AMS |
| 42 | 28 | 2018072013154600 | FST | AMS | 33 | 2018072013174300 | FST | AMS |
| 43 | 28 | 2018072013154700 | FST | AMS | 33 | 2018072013174200 | FST | AMS |
| 44 | 28 | 2018072013154800 | FST | AMS | 33 | 2018072013174100 | FST | AMS |
| 45 | 28 | 2018072013154900 | FST | AMS | 33 | 2018072013174000 | FST | AMS |
| 46 | 29 | 2018072901123600 | NORM | CTRLR | 33 | 2018072013173900 | FST | AMS |
| 47 | 30 | 2018072901123700 | NORM | CTRLR | 33 | 2018072013173800 | FST | AMS |
| 48 | 31 | 2018072901123800 | NORM | CTRLR | 33 | 2018072013173700 | FST | AMS |
| 49 | 32 | 2018072901123900 | NORM | CTRLR | 33 | 2018072013173600 | FST | AMS |
| 50 | 35 | 2018072901124000 | NORM | CTRLR | 33 | 2018072013173500 | FST | AMS |

*FIG. 4B*

| Position | HIGH-WATER OPEN | | | | HIGH-WATER CLOSE | | | |
|---|---|---|---|---|---|---|---|---|
| | Force | Time | Op | Op Srce | Force | Time | Op | Op Srce |
| 51 | 37 | 2018072901124100 | NORM | CTRLR | 33 | 2018072013173400 | FST | AMS |
| 52 | 36 | 2018072901124200 | NORM | CTRLR | 33 | 2018072013173300 | FST | AMS |
| 53 | 35 | 2018072901124300 | NORM | CTRLR | 33 | 2018072013173200 | FST | AMS |
| 54 | 33 | 2018072901124400 | NORM | CTRLR | 33 | 2018072013173100 | FST | AMS |
| 55 | 28 | 2018072013155900 | FST | AMS | 33 | 2018072013173000 | FST | AMS |
| 56 | 28 | 2018072013160000 | FST | AMS | 33 | 2018072013172900 | FST | AMS |
| 57 | 28 | 2018072013160100 | FST | AMS | 33 | 2018072013172800 | FST | AMS |
| 58 | 28 | 2018072013160200 | FST | AMS | 33 | 2018072013172700 | FST | AMS |
| 59 | 28 | 2018072013160300 | FST | AMS | 33 | 2018072013172600 | FST | AMS |
| 60 | 28 | 2018072013160400 | FST | AMS | 33 | 2018072013172500 | FST | AMS |
| 61 | 28 | 2018072013160500 | FST | AMS | 33 | 2018072013172400 | FST | AMS |
| 62 | 29 | 2018072123582700 | NORM | CTRLR | 33 | 2018072013172300 | FST | AMS |
| 63 | 35 | 2018072123582800 | NORM | CTRLR | 33 | 2018072013172200 | FST | AMS |
| 64 | 38 | 2018072123582900 | NORM | CTRLR | 33 | 2018072013172100 | FST | AMS |
| 65 | 28 | 2018072013160900 | FST | AMS | 33 | 2018072013172000 | FST | AMS |
| 66 | 28 | 2018072013161000 | FST | AMS | 33 | 2018072013171900 | FST | AMS |
| 67 | 28 | 2018072013161100 | FST | AMS | 33 | 2018072013171800 | FST | AMS |
| 68 | 28 | 2018072013161200 | FST | AMS | 33 | 2018072013171700 | FST | AMS |
| 69 | 28 | 2018072013161300 | FST | AMS | 33 | 2018072013171600 | FST | AMS |
| 70 | 28 | 2018072013161400 | FST | AMS | 33 | 2018072013171500 | FST | AMS |
| 71 | 28 | 2018072013161500 | FST | AMS | 33 | 2018072013171400 | FST | AMS |
| 72 | 28 | 2018072013161600 | FST | AMS | 33 | 2018072013171300 | FST | AMS |
| 73 | 28 | 2018072013161700 | FST | AMS | 33 | 2018072013171200 | FST | AMS |
| 74 | 28 | 2018072013161800 | FST | AMS | 33 | 2018072013171100 | FST | AMS |
| 75 | 28 | 2018072013161900 | FST | AMS | 33 | 2018072013171000 | FST | AMS |
| 76 | 29 | 2018072013162000 | FST | AMS | 34 | 2018072013170900 | FST | AMS |
| 77 | 29 | 2018072013162100 | FST | AMS | 36 | 2018072111080400 | NORM | CTRLR |
| 78 | 30 | 2018072013162200 | FST | AMS | 36 | 2018072013170700 | FST | AMS |
| 79 | 31 | 2018072013162300 | FST | AMS | 37 | 2018072013170600 | FST | AMS |
| 80 | 32 | 2018072013162400 | FST | AMS | 38 | 2018072013170500 | FST | AMS |
| 81 | 33 | 2018072013162500 | FST | AMS | 39 | 2018072013170400 | FST | AMS |
| 82 | 34 | 2018072013162600 | FST | AMS | 40 | 2018072013170300 | FST | AMS |
| 83 | 35 | 2018072013162700 | FST | AMS | 41 | 2018072013170200 | FST | AMS |
| 84 | 36 | 2018072013162800 | FST | AMS | 42 | 2018072013170100 | FST | AMS |
| 85 | 37 | 2018072013162900 | FST | AMS | 43 | 2018072013170000 | FST | AMS |
| 86 | 38 | 2018072013163000 | FST | AMS | 44 | 2018072013165900 | FST | AMS |
| 87 | 39 | 2018072013163100 | FST | AMS | 45 | 2018072013165800 | FST | AMS |
| 88 | 40 | 2018072013163200 | FST | AMS | 46 | 2018072013165700 | FST | AMS |
| 89 | 41 | 2018072013163300 | FST | AMS | 47 | 2018072013165600 | FST | AMS |
| 90 | 42 | 2018072013163400 | FST | AMS | 48 | 2018072013165500 | FST | AMS |
| 91 | 42 | 2018072013163500 | FST | AMS | 48 | 2018072013165400 | FST | AMS |
| 92 | 43 | 2018072013163600 | FST | AMS | 49 | 2018072013165300 | FST | AMS |
| 93 | 44 | 2018072013163700 | FST | AMS | 50 | 2018072013165200 | FST | AMS |
| 94 | 45 | 2018072013163800 | FST | AMS | 50 | 2018072013165100 | FST | AMS |
| 95 | 46 | 2018072013163900 | FST | AMS | 51 | 2018072013165000 | FST | AMS |
| 96 | 47 | 2018072013164000 | FST | AMS | 52 | 2018072013164900 | FST | AMS |
| 97 | 48 | 2018072013164100 | FST | AMS | 53 | 2018072013164800 | FST | AMS |
| 98 | 49 | 2018072013164200 | FST | AMS | 53 | 2018072013164700 | FST | AMS |
| 99 | 50 | 2018072013164300 | FST | AMS | 63 | 2018072215223400 | NORM | CTRLR |
| 100 | 51 | 2018072013164400 | FST | AMS | 70 | 2018072215223300 | NORM | CTRLR |

*FIG. 4C*

MAXIMUM FORCE LOGGING AND OPERATIONAL PERFORMANCE PROGNOSTICS FOR PROCESS CONTROL DEVICES

TECHNOLOGICAL FIELD

The disclosure relates generally to process control device diagnostics and, more specifically, to tracking high force events occurring in a valve actuator.

BACKGROUND

Existing process control systems may perform diagnostics on process control devices, or process control components, such as valves, to determine the operability and performance of such devices and components. Determining the current operating characteristics of a process control device may facilitate improved scheduling of maintenance for the process control device, thereby decreasing failure occurrences and down time. For example, by understanding the current condition of the control device, unnecessary maintenance may be avoided, necessary maintenance may be scheduled in advance to correspond with scheduled down time, and failures may be avoided, resulting in increased efficiency, safety, product quality, and revenue. The process control systems may use various sensors and other measurement devices to observe characteristics of a process control device.

One diagnostic used for valves and actuators is a valve signature that measures the position of a valve element against an input to the valve, such as a control signal, a pressure in an actuator (e.g., fluid pressure in a chamber of a pneumatic actuator), or a mechanical force exerted by an actuator (e.g., torque exerted by a motor of an electric actuator). Valve signature data may be analyzed or compared to previously recorded data to determine whether the valve and/or actuator are operating normally or whether any degradation in performance or control of the valve or actuator have occurred.

In some existing systems, sensors connected to a process control device collect valve signature data and transmit that data to a process controller for analysis, including comparison to previously collected and transmitted valve signature data. Such systems, however, have a number of drawbacks. First, systems that rely on a process controller for signature data collection and analysis require a significant amount of data to be transmitted over a process control network each time valve signature data is collected. These systems thus place a large network capacity demand on the process control network. Further, these systems place a large processing demand on the process controller that receives and analyzes signature data, typically from many connected process control devices and components in the process control system.

In existing systems, considerations of network bandwidth and controller loading effectively limit the regularity at which valve signature data may be analyzed and the size of valve signature data sets that can be generated and transmitted over the process control network. Such systems may, for example, only collect and transmit actuator force data during particular testing phases (e.g., during particular partial stroke or full stroke tests) or at predetermined intervals. The limited force data collection and transmission capability of existing systems in turn limits the ability to diagnose potential issues with an electric actuator or valve.

SUMMARY

The methods and apparatus described herein may continuously monitor operation of an actuator operating to affect position of a valve element in a valve. Firmware of the actuator may cause the actuator to measure and record force values at the actuator while the valve element is positioned at each of a predefined number of position points in each of the open and closed directions (e.g., at increments of each 1% of valve travel from 0% to 100% travel). A high-water mark force log or "high force profile" is created, stored, and updated at the actuator to continuously reflect the highest force value at each position point, across various operations of the actuator.

Graphical displays of the high force profile may be provided on a local display module, a remote display module, an attached workstation, etc., and may be overlaid with other force/position data such as force/position data for full stroke test (FST) operations, partial stroke test (PST) operations, and emergency stroke operations. Techniques described herein may enable detection of, and provide alerts or alarms for, over torque conditions, under torque conditions, stick-slip conditions, and/or other conditions that may indicate problems in the actuator, in the valve, or elsewhere in a process environment.

By performing these monitoring and analysis actions at the actuator level (i.e., instead of at the process controller), the techniques described herein reduce the demands on the process controller and on the process control network imposed by previous systems. Performance of these actions at the actuator level further allows for frequent analysis actuator and valve health indicated by actuator data using the processing power of the actuator itself. Based upon the monitored and analyzed force data, various remedial actions may be taken in the process environment to reduce failure occurrences and down time.

In embodiments, an actuator of a process control device continuously monitors actuator force and records high force values at each position point by continuously executing a routine in a processor of the actuator. The routine includes receiving from a position sensor a current position value indicating a position of a valve element in the valve, and from a force sensor a current force value indicating a force applied by the actuator. The routine also includes retrieving, from a memory device coupled to the processor, a previous force value measured at the current position, and comparing the current force values for the current position with the previous force value for the current position. If the current force value for the current position exceeds the previous force value for the current position, the routine replaces the previous force value for the current position with the current force value for the current position in memory.

An actuator according to the description includes a position sensor that is configured to measure a position of a valve element and to output a corresponding position value. The actuator also includes a force sensor that is configured to measure a force applied by the actuator and to output a corresponding force value. A processor communicatively coupled to the position sensor and the force sensor is coupled to a memory device storing computer-executable instructions that, when executed by the processor, cause the processor to repeatedly execute a routine. The routine includes receiving a position value from the position sensor, the position value indicating the current position of the valve element and receiving a force value from the force sensor, the force value indicating the current force applied by the actuator. The routine also includes retrieving, from a location in the memory corresponding to the current position, a stored force value for the current position and comparing the current force value to the stored force value. The routine replaces in the memory the stored force value with the current force value if the current force value exceeds the stored force value.

A non-transitory, computer-readable medium according to the description stores machine-executable instructions that, when executed by a processor, cause the processor to repeatedly execute a routine. The routine includes receiving from a position sensor a current position value indicating a position of a valve element in a valve and receiving from a force sensor a current force value indicating a force applied by an actuator coupled to the valve. The routine also includes retrieving, from a memory device coupled to the processor, a previous force value measured at the current position and comparing, by the processor, the current force value for the current position with the previous force value for the current position. The routine replaces the previous force value for the current position with the current force value for the current position in the memory device if the current force value for the current position exceeds the previous force value for the current position.

BRIEF DESCRIPTION OF THE DRAWINGS

FIG. 2C illustrates a data structure storing data corresponding to the force curves in FIGS. 2A-2B;

FIGS. 4A-4C illustrate additional exemplary data structures storing data for full and partial stroke tests (FIG. 4A), and high-water force data (FIGS. 4B, 4C);

DETAILED DESCRIPTION

Figure 1:
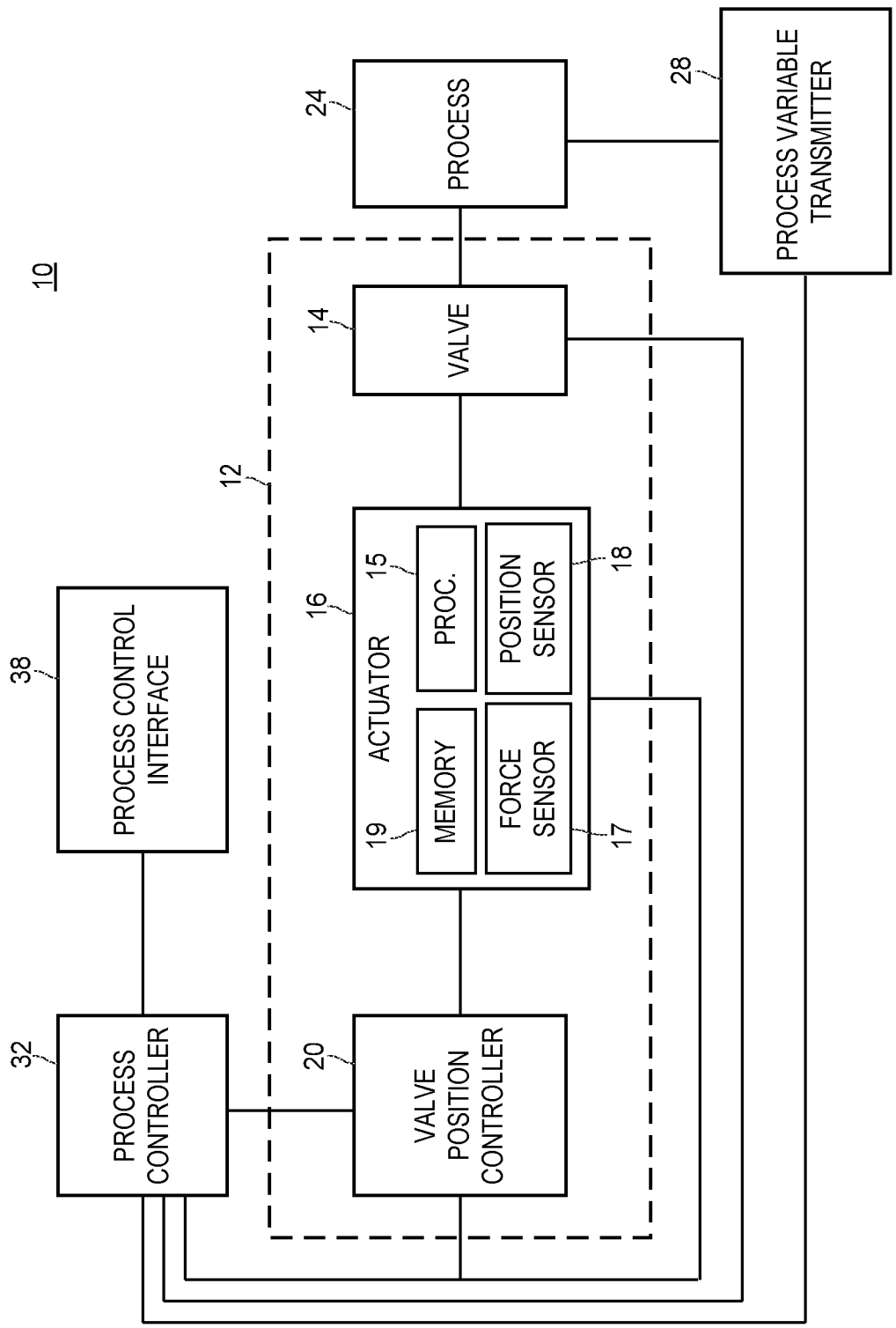
FIG. 1 depicts an example process control environment including a valve assembly including an actuator, in accordance with some embodiments.

Although the following text sets forth a detailed description of one or more exemplary embodiments of the invention, it should be understood that the legal scope of the invention is defined by the words of the claims set forth at the end of this patent. Accordingly, the following detailed description is to be construed as exemplary only, and does not describe every possible embodiment of the invention, as describing every possible embodiment would be impractical, if not impossible. Numerous alternative embodiments could be implemented, using either current technology or technology developed after the filing date of this patent. It is envisioned that such alternative embodiments would still fall within the scope of the claims defining the invention.

The present disclosure generally describes techniques for monitoring force values at an actuator, with respect to valve element position. In contrast with previous actuators, in which partial stroke tests (PSTs) and full stroke tests (FSTs) are periodically executed to generate curves showing the force applied at various valve element positions, the actuators of the presently described embodiments monitor actuator force continuously, recording for each valve element position the highest measured force. The actuators may generate, store, and update a "high-water mark" force log in order to provide a "high force profile" that reflects the highest measured force at each of a plurality of valve element positions.

As used herein, the term "force" refers to the mechanical force that is delivered by an actuator to a valve. Such a force can be measured directly (e.g., via a load cell) or indirectly (e.g., as a pressure in a pneumatic actuator, a current drawn by an electric motor in an electric actuator, etc.). Thus, a force sensor may measure a force delivered by an actuator either directly or indirectly and a force value can be expressed in terms of the measured parameter (e.g., current, pressure, force) or converted to units of force based on properties of the actuator. When the force is applied to rotate an element of the valve, the force may be expressed in terms of torque.

Existing actuator implementations typically store only a limited amount of actuator force data, and typically store such data only on an on-demand basis. For example, due to memory constraints, an existing actuator (e.g., an electric actuator) may only store force (e.g., torque) data pertaining to a single partial stroke test and/or a single full stroke test at any given time. Moreover, existing actuator implementations may rely on a process controller communicatively connected to the actuator to initiate the partial and/or full stroke tests (e.g., manually, automatically, on a schedule, etc.), receive the data resulting from the tests, and perform analysis of monitored actuator force. These techniques may limit the efficacy of actuator force analysis, and additionally may place undesirable burdens on a process control network to transmit the force data, and on a process controller to perform the analysis. Via the techniques of the present application, an actuator may continuously monitor and analyze actuator force values to more effectively diagnose and/or predict problems in the actuator, in a valve, or elsewhere in a process environment.

Example Process Control Environment

FIG. 1 depicts an example process control environment 10 ("process environment," e.g., a process plant) including a valve assembly 12, in accordance with some embodiments. The valve assembly 12 includes a valve 14 ("valve"), which may be a control valve used to throttle the flow of a process material (e.g., a fluid) or a block valve used to isolate the process material from downstream elements of the process control system. The valve 14 may include a moveable valve element (e.g., a disc, ball, plug, etc.) that may be selectively positioned at or between an "open" position and a "closed" position to control the flow of the process material. The valve 14 may be positioned via linear motion of the moveable element, such as in a sliding stem valve (e.g., a globe valve or an angle body valve) or via a rotary motion of the moveable element, such as in a rotary valve (e.g., a butterfly valve, ball valve, quarter-turn valve, etc.). Various other types of valves exist and could be used with the present embodiments. Generally, the choice of valve 14 may be based upon various characteristics of the process. As used herein, references to the valve position and/or to positioning the valve refer, respectively, to the position of the valve element within the valve and adjusting the position of the valve element.

In any case, the moveable element of the valve 14 may be moved via an input from an actuator 16. If the actuator 16 is an electric actuator, the actuator 16 may operate via an electric motor to generate and apply a force to position the valve 14 (e.g., to position the moveable element thereof) according to received command signals. The electric motor may be activated, for example, via a motor control unit (e.g., an ON-OFF switch). If the actuator 16 is a pneumatic actuator, the actuator 16 may operate via pneumatic pressure to position the valve 14.

The actuator 16 may include a force sensor 17 that may monitor (e.g., detect and/or record) a value of the force that is provided by the actuator 16. This "force value," may be measured in different manners (e.g., the current required to drive an electric motor in an electric actuator, the speed of an electric motor in an electric actuator, the axial displacement of an electric actuator's sliding worm gear, the pressure that acts on a control surface such as a diaphragm or piston of a pneumatic or hydraulic actuator, directly via a load cell, etc.) and can be expressed as an absolute value in units of the measured parameter (e.g., current, speed, displacement, pressure, force, etc.) or as an absolute value of the driving force (e.g., torque, force, etc.). Alternatively, a force value may be expressed as a relative value, such as a percentage of a maximum rated force (e.g., maximum rated torque) of an electric actuator (e.g., 30% of max rated torque, 50% of max rated torque, etc.). The maximum rated force value may be stored at and/or otherwise retrieved by the actuator 16, in some embodiments while, in other embodiments, a sensor measuring the force may output a signal representative of a percentage of the maximum rated force.

The actuator 16 may further include a position sensor 18 that may monitor (e.g., detect and/or record) the position of the valve 14 (e.g., position of the moveable element of the valve 14). Valve position may be represented, in some embodiments, as a "percentage of travel" (% travel) of the valve (e.g., of the moveable element) between the open and closed positions. As understood in the field of process control, "0% travel" typically corresponds to the position of the valve when fully closed, while "100% travel" typically corresponds to the position of the valve when fully open. (Of course, the definitions of 0% and 100% travel may be defined inversely in some embodiments.) Accordingly, values between 0% and 100% travel may correspond to positions of the valve when partially open and partially closed. In some embodiments, the position sensor 18 may additionally or alternatively be implemented as a component within the valve 14 and/or as a standalone position sensor.

In embodiments described herein, the actuator 16 includes one or more computer processors 15 and one or more computer memories 19 coupled thereto, which may include one or more volatile computer memories (e.g., RAM) and/or one or more non-volatile computer memories (e.g., non-transitory memories such as ROM, PROM, EPROM, EEPROM, flash memory, etc.). The one or more non-volatile memories 19 may comprise non-transitory computer-executable instructions (e.g., firmware) that cause the processor 15 of the actuator 16 to perform actions described herein. For example, firmware of the actuator 16 may include instructions to receive, record, and monitor actuator force values and valve position according to the techniques described in this detailed description. As used herein, the terms "receive," "receiving," and the like, when used to describe the receipt by the processor 15 of data from the force sensor 17 and/or the position sensor 18, denote the acquisition (e.g., sampling) of data by the processor 15 from said sensor 17, 18. Those of ordinary skill in the art will readily appreciate that such data may be received at the processor 15 directly from the sensor 17 and/or 18 (e.g., at an analog-to-digital (ADC) converter circuit in the processor 15), or may be received at the processor 15 from an external ADC disposed, for example, adjacent to or within the circuitry of the sensor 17 and/or 18. In any event, the term "receive" is intended to denote the acquisition of the sensor data.

It should be understood that while an actuator 16 is generally described herein with respect to electric and pneumatic actuators, the techniques described herein may also be similarly applied in process control environments comprising other types of actuators, such as a hydraulic actuator or a manual actuator.

The position of the moveable element of the valve 14 is adjusted by an actuator control signal such as an on-off signal to drive an electric motor in an electric actuator or a pneumatic control signal (e.g., 3-15 psig) to drive a pneumatic actuator. In the illustrated example, the actuator control signal is generated by a valve position controller 20 in accordance with a valve position control signal (e.g., a 4-20 mA signal corresponding to a desired valve position) that is received by the valve position controller 20 from a process controller 32. In some embodiments, the position sensor 18 may transmit the valve position to the valve position controller 20 to facilitate a control loop. While the valve 14 is illustrated as being controlled by a process controller 32, the valve 14 may also be controlled manually such as via a handwheel that is part of the actuator 16 or via manual controls (e.g., local controls that enable manual start and stop commands to an electric motor) that are part of the actuator 16. The collection of force and position values as disclosed herein may occur in the same manner regardless of the method in which the valve 14 is being actuated (e.g., via process controller 32, manually, via asset management system stroke test, etc.).

Operation of the valve 14 may affect downstream elements of a valve-controlled process 24. Values of one or more process variables (e.g., flow, temperature, pressure) of the valve-controlled process 24 may be measured, stored, and/or transmitted via one or more process variable transmitters 28 (e.g., one or more sensors and/or transmitters). The one or more process variable transmitters 28 may transmit the values of the one or more process variables to the process controller 32 such that the process controller 32 may generate the valve position control signal in accordance with the measured value of the process variable and a desired value of the process variable, for example.

In operation, a user may interact with the valve assembly 12, the process 24, and/or process controller 32 at a user process control interface 38 ("user interface") that provides commands to, and receives data from, the process controller 32. The process controller 32 may generate control signals that are ultimately communicated to the process control devices under its control (e.g., one or more valve assemblies 12) in accordance with inputs that are provided via the interface 38 (e.g., process variable setpoints, manual control device setpoints, etc.). For example, the process controller 32 may execute a control algorithm (e.g., a PID control algorithm) to generate a valve position control signal to adjust the position of a valve 14 to maintain the value of a process variable at a desired setpoint. While a single control loop is illustrated in FIG. 1, it will be understood that the process controller 32 may execute control algorithms associated with numerous control loops.

In some embodiments, the actuator 16 may include additional elements to protect the actuator 16 and/or the valve 14. For example, the actuator 16 may include (or otherwise be operatively connected to) one or more thermal sensors operable to monitor a temperature of the actuator 16 or of a fluid flowing through the actuator 16. The one or more thermal sensors may be operatively connected to one or more thermal switches and may be configured so as to cease operation of a motor via the one or more thermal switches when an excess temperature is detected. In an electric actuator, the actuator 16 may include one or more current sensors configured to monitor a current draw of the actuator 16. The actuator 16 may additionally or alternatively include one or more voltage sensors configured to monitor a voltage at the actuator 16, when the actuator 16 is an electric actuator.

As should be well-understood, the process controller 32 controls the process 24 according to a set of programmed instructions that receive input data from various process control devices and, in some cases, from one or more human operators, and generate outputs to control the various process control devices in the process 24. Logic executing in the process controller 32 operates on the inputs to produce the outputs in a manner that is generally automated, using control loops, process modules, function blocks, and other programming constructs to keep the process operating within certain bounds to produce a product. The process controller 32 may also generate alarms or take mitigating action(s) (e.g., adjusting the operation of the process, shutting the process down, etc.) when one or more process variables stray beyond corresponding thresholds specified during configuration of the process.

In any event, the process controller 32 communicates with other control devices used in the plant for process control. Communication between the process controller 32 and one or more other control devices (including the control devices depicted in FIG. 1) may be implemented via hardwired and/or wireless communications, in various embodiments. The process controller 32 includes one or more processors, one or more memory devices, and receives and transmits data via one or more input/output (I/O) devices.

In some embodiments, the user process control interface 38 may be integrated with the process controller 32. However, in typical embodiments, the user process control interface 38 is embodied as one or more remote workstations (e.g., "operator workstations," "configuration workstations," etc.) communicatively coupled to the process controller 32 and executing one or more applications that facilitate configuration, operation, and maintenance of the various process control devices in the process plant.

As will be understood, during normal operation of the process, the process controller 32 may output signals that cause the valve 14 to be actuated by the actuator 16. Over the course of normal operation, the process controller 32 may cause the actuator 16 to increase the valve aperture (i.e., open the valve) and to decrease the valve aperture (i.e., close the valve). Valve movement is typically not instantaneous. That is, a valve may be swept from a first position to a second position over seconds, minutes, or even hours, as necessary for the process. Additionally, electrically actuated valves typically are less capable of quick movement than pneumatically actuated valves. The process controller 32 may also periodically (according to a schedule or on demand) initiate a full or partial stroke test causing the valve to be actuated from fully closed to fully open or from fully open to fully closed in the case of a full stroke test, or from one position to another (e.g., from fully open to 70%) in the case of a partial stroke test. Full and partial stroke tests may also be initiated from sources other than the process controller 32, such as the user process control interface 38 (via the process controller 32), a remote host, a local display module (LDM), a remote display module (RDM), a hardwired control (e.g., a button on the actuator), etc.

The actuator 16 may be configured to detect and/or record the actuator force values when the valve 14 is at each of a plurality of position points. The actuator 16 may, for example, record the force values at each increment of 1% of travel of the valve 14 in each of the open and closed directions. That is, during opening and closing of the valve 14, the actuator 16 may measure and record actuator force values when the valve is at 0% travel while in any opening phase (but still fully closed), at 1% travel while the valve 14 is opening, at 2% travel while opening, etc., up to 98% travel while opening, 99% travel while opening and 100% travel while opening (fully open). The actuator 16 may further record the actuator force values when the valve 14 is at 100% travel while in a closing phase (but still fully open), 99% travel while closing, 98% travel while closing, etc., down to 2% travel while closing, 1% travel while closing, and finally 0% travel while closing (fully closed). It should be emphasized that, where a first force value may be measured when the valve 14 is at any X % travel position point in the open direction, a different force value may be measured when the valve 14 is positioned at the X % travel position point in the closed direction.

While 1% travel increments between position points will generally be discussed herein, other configurations of position points may be used, in embodiments. The position points may, for example, be separated by 5% travel increments, 2% increments, 0.5% increments, 0.1% increments, 0.05% increments, etc. Moreover, while uniform increments between data points (i.e., a same X % increment across 0% to 100% travel) will be discussed herein, non-uniform travel increments may be used, in some embodiments. For example, adjacent position points may be separated by smaller travel increments near one or more ends of travel (e.g., 0.5% or 1% travel increments near the ends 0% and 100% travel), while the position points may be separated by larger travel increments in the middle of travel (e.g., 2% or 5% travel increments between 40% and 60% travel).

Effectively, smaller increments for the position points (and/or a faster stroke between the data points) may necessitate a higher sampling rate for the sensor 17 measuring the actuator force values so as not to miss a data point because, for example, the valve moved through more than one position point between samples. As a result, the sampling rate of the force sensor 17 measuring actuator force values at the actuator 16 is, in embodiments, greater than the rate at which the actuator 16 is capable of actuating the valve 14 between any two adjacent position points.

Figure 2A:
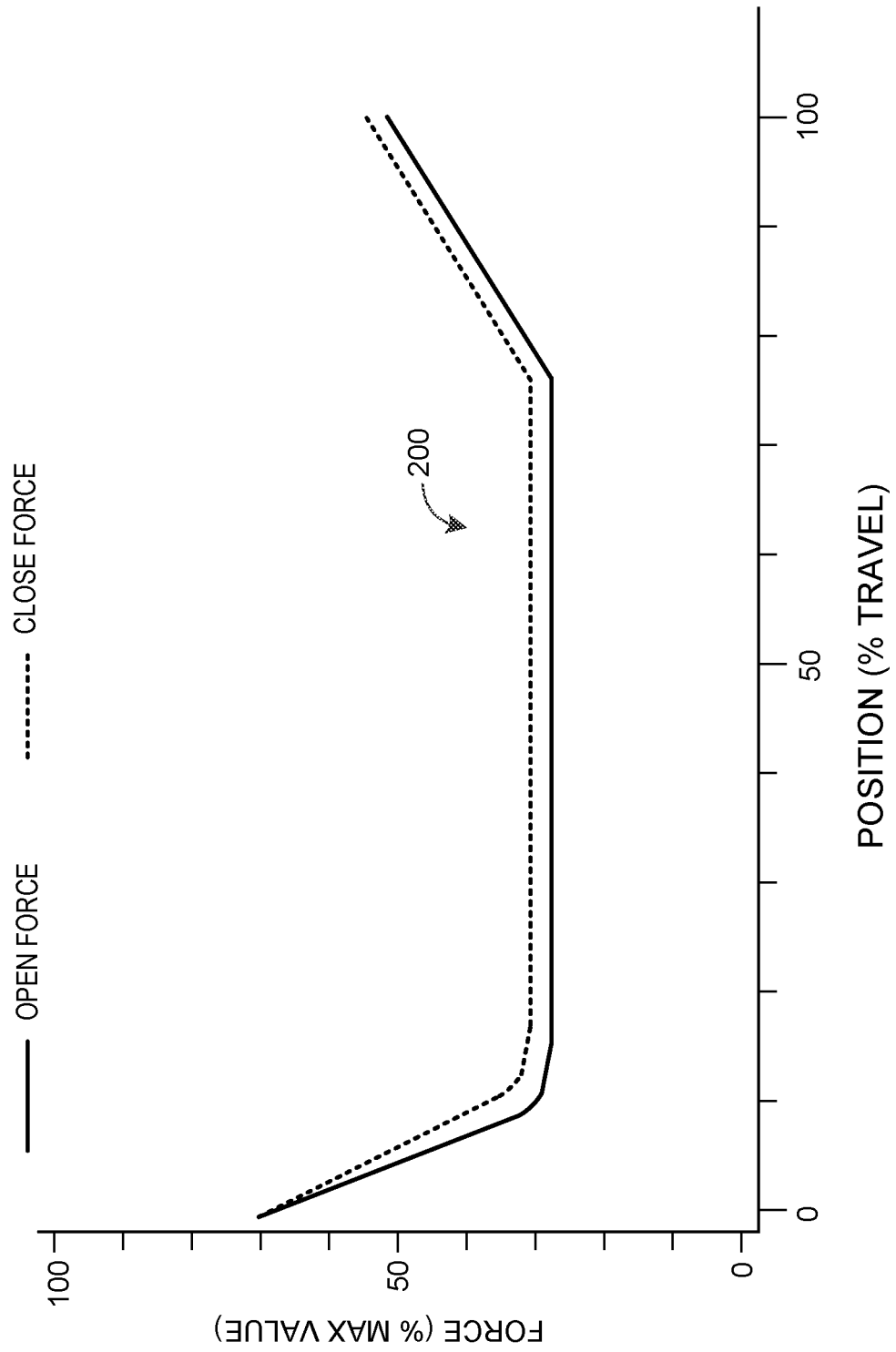
FIGS. 2A-2B depict example force curves that may be generated by full and partial stroke tests, respectively, of the actuator of FIG. 1, in accordance with some embodiments.
Figure 2B:
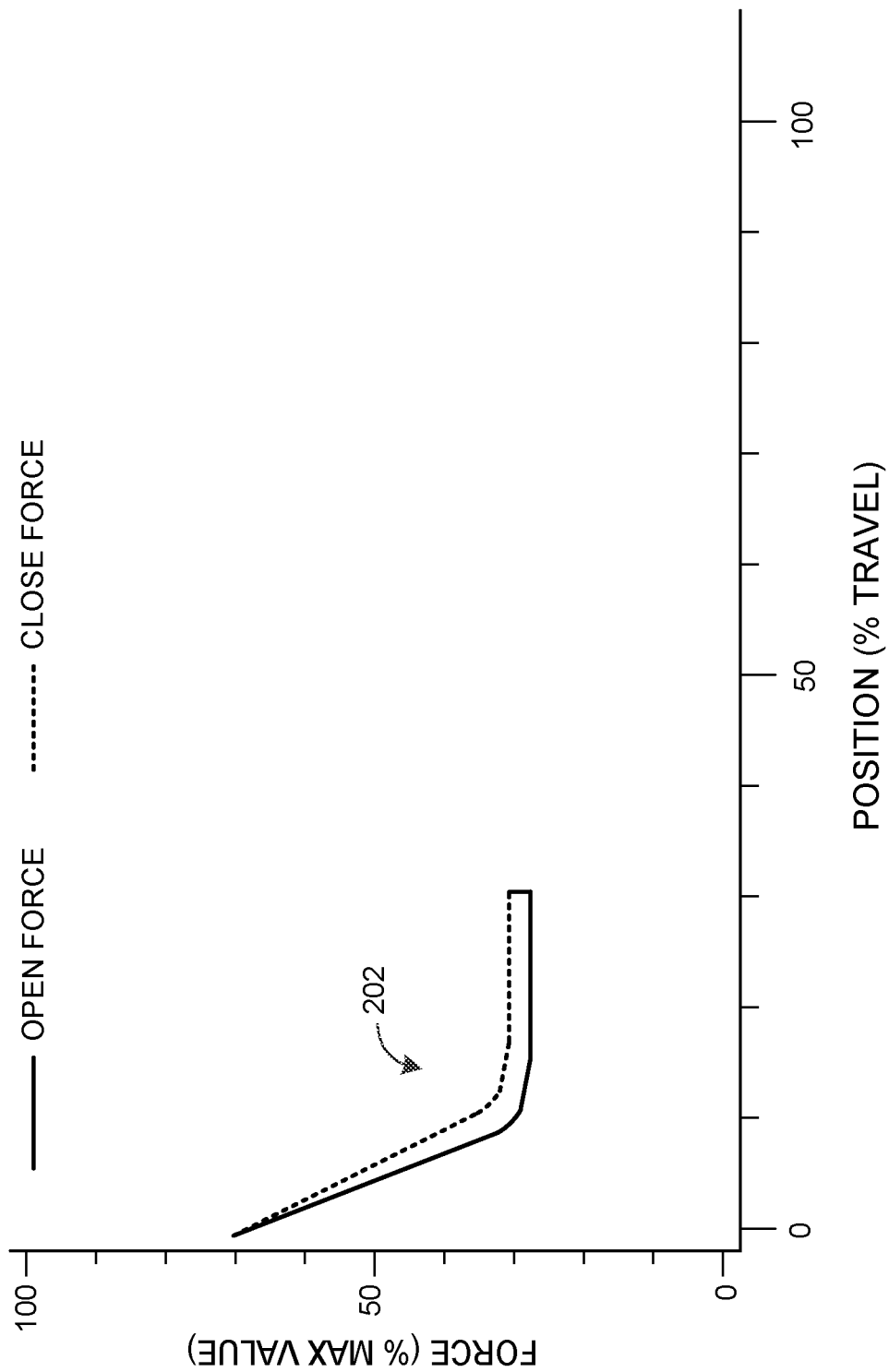

Upon initiation and execution of a partial or full stroke test, the actuator 16 may be configured to store, for each position point through which the valve traverses during the test, a force value. For example, in an actuator set to record force values at 1% increments, a full stroke test may result in 202 force values being stored—one force value for each position 0% through 100% while the valve is opening and one force value for each position 100% through 0% while the valve is closing. The data may be depicted graphically as one or more force curves. Generally, a "force curve" may correspond to a group of force/position data points for the open direction, a group of force/position data points for the close direction, or a group of force/position data points in both directions. FIG. 2A depicts an example force curve 200 that may result from the data recorded for such a full stroke test conducted on an electric actuator. The curve 200 represents, for each position point traversed by the valve during the full stroke test, a torque value—as a percentage of maximum torque—corresponding to the force applied to the valve. Similarly, FIG. 2B depicts an example force curve 202 that may result from the data recorded for a partial stroke test conducted on an electric actuator. The curve 202 represents, for each position point traversed by the valve during the partial stroke test, a torque value—as a percentage of maximum torque—corresponding to the force applied to the valve. As depicted in FIG. 2B, the PST includes opening of the valve from the 0% travel position (closed) to a partially open position of 30% travel. While the "0%-30% PST" is depicted in FIG. 2B, a PST may alternatively stroke the valve between a different range of valve positions (e.g., 25% to 75% travel or 70% to 100% travel), in some embodiments.

In embodiments, the data corresponding to the example force curves 200, 202 depicted in FIGS. 2A and 2B may be stored in the memory device 19 of the actuator 16 and, in particular, in a data structure in the memory 19. An exemplary depiction of such a data structure is illustrated in FIG. 2C. FIG. 2C depicts a table 204 having a plurality of rows 206 corresponding to the positions at which force measurements are captured, and a plurality of columns in which force values are recorded. For instance, columns 208 and 210 store force values for opening and closing force, respectively, during a full stroke test, while columns 212 and 214 store force values for opening and closing force, respectively, during a partial stroke test.

The force values recorded for a full stroke test may be rewritten (i.e., new values replacing previous values) each time a full stroke test is executed. Similarly, the force values recorded for a partial stroke test may be rewritten (i.e., the values erased and new values written) each time a partial stroke test is executed. While the table 204 depicts data for only one each of a FST and a PST, in some embodiments, the actuator 16 may be programmed to store data of multiple (e.g., the most recent 2, 3, 5, or 10) FST and PST executions.

The data structure (e.g., table 204) may be stored on a memory device of the actuator 16 and/or may be transmitted to the process controller 32. When transmitted to the process controller 32, the data may be transmitted automatically upon completion of the FST or PST cycle, or may be transmitted upon receiving from the process controller 32 a request for the data.

Continuous Force Monitoring

The actuator 16 may also be configured to continuously monitor (e.g., measure and/or record) actuator force values with respect to valve position during various phases of operation of the valve assembly 12. That is, the actuator 16 may continuously monitor force values and/or valve position during any combination of partial stroke tests (PST), full stroke tests (FST), emergency strokes, normal operations, and/or other phases of operation of the valve assembly 12.

Generally speaking, the embodiments described herein contemplate valve actuators that store, for each position point, one or more maximum ("high-water") force values at that point, as measured during normal operation of the actuator (e.g., not during partial or full stroke tests and/or emergency strokes). These "high-water" measurements may be stored instead of or in addition to the force values stored during PST and/or FST operations. In embodiments, two force values are stored for each position point: one force value in the opening direction and one force value in the closing direction. In embodiments, the actuator 16 additionally stores, for each position point, one or more force values at that point, as measured during test operation of the actuator 16 (e.g., during partial or full stroke tests) and/or during emergency strokes of the actuator 16.

It should be noted that force/position data detected and stored during a stroke test or emergency stroke of the actuator 16 will generally be captured during a discrete, contiguous time period. That is, during a stroke test, the force data detected and stored at each position point will be detected and stored at a time generally immediately preceding or following the time of the force data at the adjacent point, such that the values for each position from 0% of travel to 100% of travel (i.e., stroking open) will be recorded linearly in time, and the values of each position from 100% of travel to 0% of travel (i.e., stroking closed) will also be recorded linearly in time.

By contrast, the high-water force/position data stored during normal operation may not be contiguous in time for adjacent positions. The reasons for this are two-fold. First, during normal operation the valve does not necessarily move from 0% to 100% of travel or from 100% to 0% of travel over a contiguous period of time. For example, the valve may move from 0% to 15% of travel, and then from 15% to 10% of travel, and then from 10% to 7% of travel, and then from 7% of travel to 95% of travel, etc., according to the needs of the process as determined from control algorithms executing in the process controller 32 and/or from operator commands sent to the controller 32 from the interface device 38. Second, during normal operation, the contemplated embodiments store data for a given position only when the force value for that position exceeds the previously stored forced value for that position. Thus, during normal operation, the force is continuously detected and evaluated and, for each position, the detected force is stored only if its magnitude exceeds the previously stored force for that position, in which case the detected value replaces the previously stored value. The stored data is considered high-water data because it represents the highest force values measured for each position.

As can be observed from FIGS. 2A-2B, an actuator force value at any position point may typically be at some value safely between 100% force (e.g., 100% of the actuator's maximum rated force), and zero force (e.g., 0% of the actuator's maximum rated force). While actuator force values over the 0% to 100% position range may vary significantly, the force value at any two nearby position points should be fairly similar. That is, sudden drops and spikes in force value are generally not observed between adjacent position points, absent a problem somewhere in the actuator 16, in the valve, or elsewhere in the process environment. As will be discussed further herein, graphical representation and analysis of force curves, such as the force curves depicted in FIGS. 2A-2B, may assist a process plant operator in identifying stick-slip conditions at the valve 14, actuator over-torque conditions, actuator under-torque conditions, and/or other anomalous conditions in the actuator 16, in the valve 14, or elsewhere in the process plant.

Figure 3:
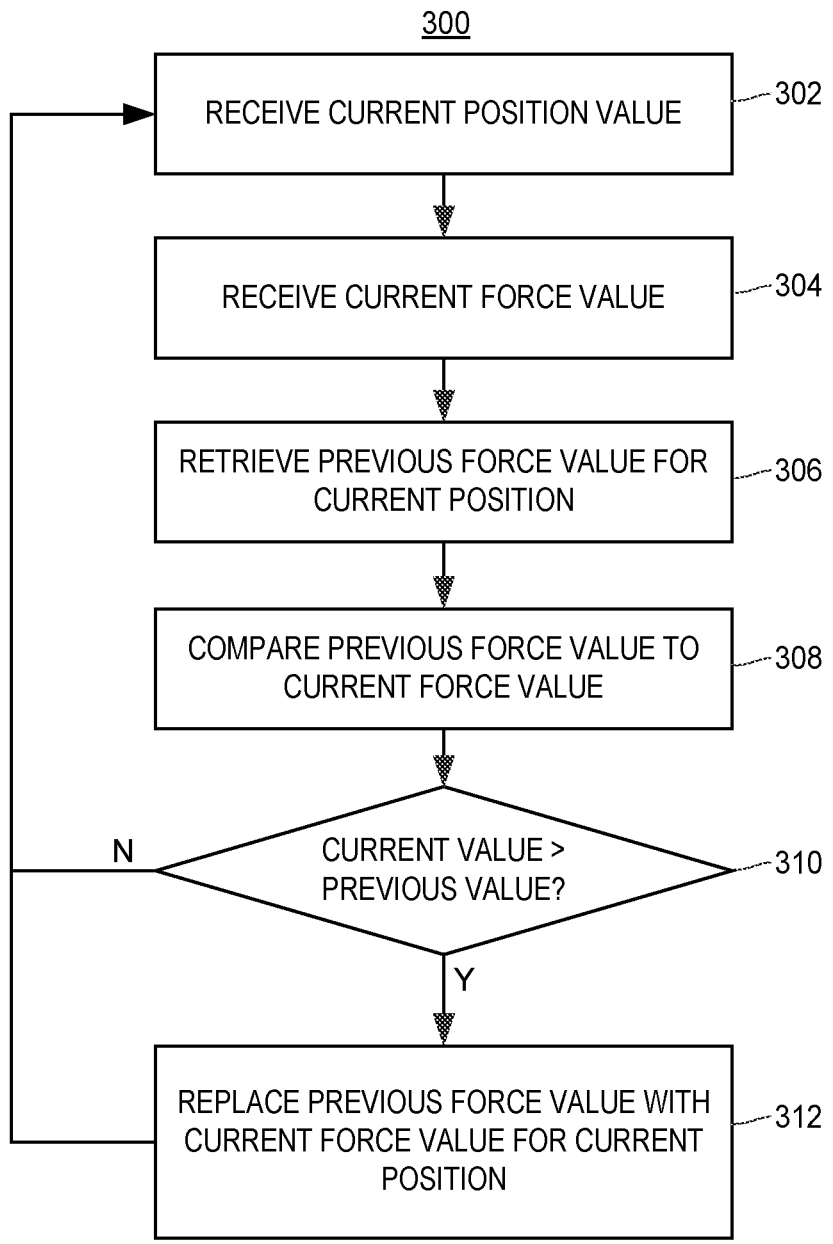
FIG. 3 is a flow chart depicting a routine for generating high-water force data in accordance with the present embodiments.

FIG. 3 depicts an example routine 300 for continuously monitoring actuator force during operation of the actuator 16 and valve 14, and for recording high-water force values. The routine 300 is performed continuously during normal operation of the valve 14. Implementation of the routine 300 (which may be executed as part of a method for actuator operation, generally) is accomplished by means of the processor 15 in the actuator 16 executing instructions stored on the computer-readable memory 19 of the actuator 16. The routine 300 is performed periodically at a rate determined such that at least one execution of the routine 300 occurs at each position of the valve 14, even when the actuator 16 is actuating the valve 14 at its fastest rate. For example, if the maximum actuation rate of the valve 14 from 0% to 100% is 100 seconds (i.e., 1 second per percent valve travel), the routine 300 should be executed at least once per second. If the actuator 16 is capable of actuating the valve from 0% to 100% in 1 second (i.e., one-hundredth of one second per percent valve travel), the routine 300 should preferably be executed at least 100 times per second.

The processor 15 is communicatively coupled to the force sensor 17 and to the position sensor 18 and samples values from each of the sensors 17, 18 each time the routine 300 is executed. That is, for each execution of the routine 300, the processor 15 receives from the position sensor 19 a position value indicating a current position of the valve 14 (block 302), and receives from the force sensor 17 a force value indicating a current force applied by the actuator 16 (block 304). It should be understood that the sensors may each have local memory allowing each to store force and position data, respectively, along with timestamps for stored data. In such implementations, the routine 300 may retrieve stored sets of data from the sensors and correlate force data to the position data by time stamp value.

In any event, the processor 15 retrieves from the memory 19 (and in particular, from a data structure stored therein) a previously stored force value for the position corresponding to the current position value (block 306). The processor 15 then compares the previously stored force value for the current position to the current force value for the current position (block 308) and, if the current force value for the current position is greater than the previously stored force value for the current position (block 310), the processor 15 replaces (i.e., writes to memory) the previous force value for the current position with the current force value for the current position (block 312).

In addition to sampling the actuator force value at each respective position point, the actuator 16 according to techniques described herein may measure, receive, and/or record additional information corresponding to each respective position point. In embodiments, the actuator 16 records a date and time ("time stamp") corresponding to each force/position data point stored in the memory 19. The time stamp indicates the date and time at which the data point was sampled. In contrast to data points related to an FST or PST operation, which are contiguous in time, occurring over a discrete time period associated with the FST or PST operation, the high-water force/position data points may be recorded at any time during normal operation, and each may be recorded at a time discontinuous from force value corresponding to the adjacent position point. Accordingly, the time stamp may provide additional relevant data to the process controller 32 or to an operator, maintenance engineer, etc.

It should be noted that, while particularly useful when associated with position/force data recorded during normal operation of the actuator 16, time stamps may be recorded with any force/position data, including force/position data recorded during FST or PST operations, emergency stroke operations, etc. Accordingly, in embodiments, the actuator 16 may further store for each position the type of operation during which each force value was recorded (e.g., a force value for a particular position may have, in addition to a time stamp, an operation value—FST, PST, normal operation, emergency stroke, etc.) and, in embodiments, the source of the operation (e.g., asset management system, controller, etc.). FIG. 4A depicts graphically an example data structure 400 storing data stored by the actuator 16 (i.e., by the processor 15 in the memory 19) for full and partial stroke tests. In the data structure 400, four subsets of data 402, 404, 406, and 408 depict position/force data for FST Open, FST Close, PST Open, and PST Close operations, respectively. In each subset 402-408 of data, a force value 410 is recorded for each valve position 412. Of course, for the subsets 406, 408 corresponding to PST operations, force values 410 are recorded only for valve positions 412 through which the valve 14 traversed during the PST. For example, in the PST operations recorded in the data subsets 406, 408, the PST operation moved the valve from 0% to 30% and back to 0% and, therefore, force values 410 are recorded only for valve positions 0-30%. The data subsets 402-408 also include time stamp data 414 indicating, for each force value 410, a date and time at which the force value was recorded. The data subsets 402-408 also include, for each force value 410, a value 416 indicating the source of the FST or PST command. While helpful in some embodiments, the time stamp data 414 and/or operation source data 416 are not required in every contemplated embodiment.

As noted previously, the force values 410 may have any unit appropriate for the actuator 16. Additionally, the force unit 410 may be recorded at any level of precision as desired. Thus, while depicted in FIG. 4A as whole number values, the force unit 410 may be recorded, in embodiments, with a precision corresponding to that of the output of the force sensor 17. For example, if the force sensor 17 outputs a value indicating the percentage of maximum force in 0.1% increments, the force values 410 may be recorded with corresponding granularity. Similarly, while depicted in FIG. 4A with 0.01 second increments, the time stamp values 414 may be recorded with any appropriate granularity, depending on the speed through which the actuator 16 moves through the positions 412, and the sampling rate of the force and position sensors 17, 18.

FIGS. 4B and 4C depict graphically an example data structure 430 storing high-water data stored by the actuator 16 (i.e., by the processor 15 in the memory 19). In the data structure 430, two subsets of data 432 and 434 record position/force data for movement in the opening and closing directions, respectively. In each subset 432, 434 of data, a force value 440 is recorded for each valve position 442. The data subsets 432, 434 also include time stamp data 444 indicating, for each force value 440, a date and time at which the force value 440 was recorded. The data subsets 432, 434 also include, for each force value 440, a value 446 indicating the type of operation during which the force value 440 was recorded (e.g., during normal operation according to control commands from the process controller, during an FST operation, etc.) and a value 448 indicating the source of the command (e.g., an asset management system (AMS), the process controller, etc.). While helpful in some embodiments, the time stamp data 444 and/or the type of operation data 446 and/or the operation source data 448 are not required in every contemplated embodiment.

In the FIGS. 4B and 4C, the high-water values first recorded correspond to the values of the FST depicted in FIG. 4A. This could occur, for example, when the high-water data are initialized to zero before performance of a first FST operation, or when the high-water data are initialized using the FST data. In any event, any time the processor 15 samples a force value at the force sensor 17 that is higher than the force value 440 recorded in the memory 19 for the position indicated by the position sensor 18, the processor 15 replaces the force value 440 in the memory 19 with the sampled force value. Thus, discontinuities in the times at which force values 440 were recorded will occur during operation of the actuator 16.

Referring to FIG. 4B, for example, the data subset 432 indicates that during opening operations of the actuator 16 as commanded by the process controller 32 during normal operation, the force values 440 sampled from the force sensor 17 by the processor 15 were higher at positions 21%-31% than the force values 442 sampled from the force sensor 17 during the FST operation. That is, the highest force value sampled while the position sensor 18 indicated a position value of 21% was 29% of maximum force, the highest force value sampled while the position sensor 18 indicated a position value of 22% was 29% of maximum force, etc.

The actuator 16 may measure, record, and/or display additional or alternative information with position/force data points, in some embodiments. Such information may include, for example, a voltage at the actuator, a current draw by the actuator, a temperature within the actuator and/or in the surrounding process environment, and/or a signal or source of a signal according to which the actuator is operating (e.g., from a Local Display Module (LDM), Remote Display Module (RDM), a hardwired signal, a remote host, etc.), in some embodiments.

It should be noted that while depicted in FIG. 1 and described herein as located within the actuator 16, the position sensor 18 may alternatively be disposed within the valve 14.

High Force Profile Generation and Display Techniques

Using the techniques described above, the actuator 16 may measure and record actuator force values at each of a plurality of position points while the actuator is operating, at any time and during any mode or method of operation of the actuator (e.g., PST, FST, emergency stroke, normal operation, hand-cranking, etc.). The actuator 16 may determine, for each particular position point, a highest force value measured/recorded at the particular position point (e.g., highest recorded force value at each 1% travel increment in the open direction and each 1% travel increment in the close direction). The actuator 16 may generate a high-water force log ("high force profile") including the highest force value at each of the plurality of position data points.

In some embodiments, the actuator may generate a "blank" high force profile when no actuator force values have yet been measured (e.g., no measurements since installation or since most recent factory reset of the actuator). Effectively, each of the "highest force values" in the high force profile may be zero or null at each position point. Alternatively, in some embodiments, the actuator may generate a high force profile by analyzing previously measured and recorded force/position data points (e.g., from an FST or PST operation) to determine highest force values, as depicted in FIGS. 4B and 4C.

In embodiments, multiple high force profiles or data sets may be stored over time. For instance, a high force profile may be archived or otherwise stored upon start of a new product batch, upon start of a new operator shift, upon a reset of some process parameter, upon calibration or maintenance of the device, or upon some time-based value (e.g., every day, every month, etc.) in order to track trends in the high force profile over time or as the process varies over time.

Figure 5A:
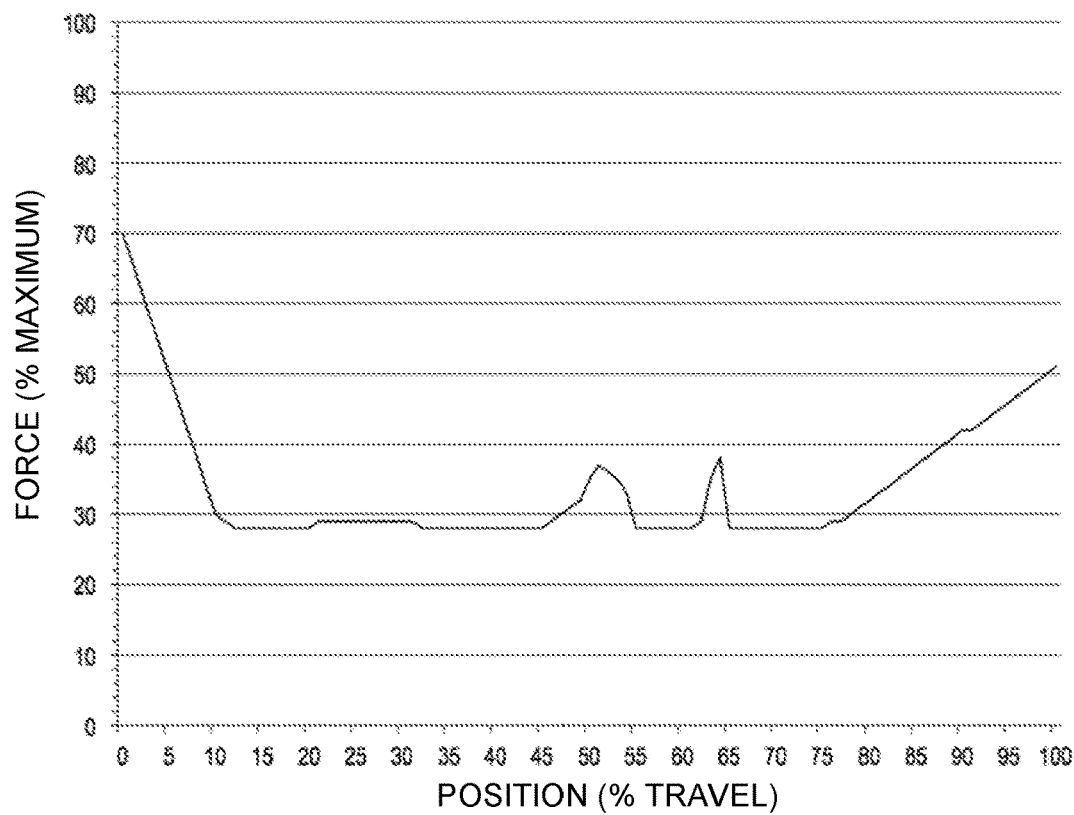
FIGS. 5A-5C depict example high-water force profiles, corresponding to the data in FIGS. 4A-4C, as may be displayed to a user, in accordance with some embodiments.
Figure 5B:
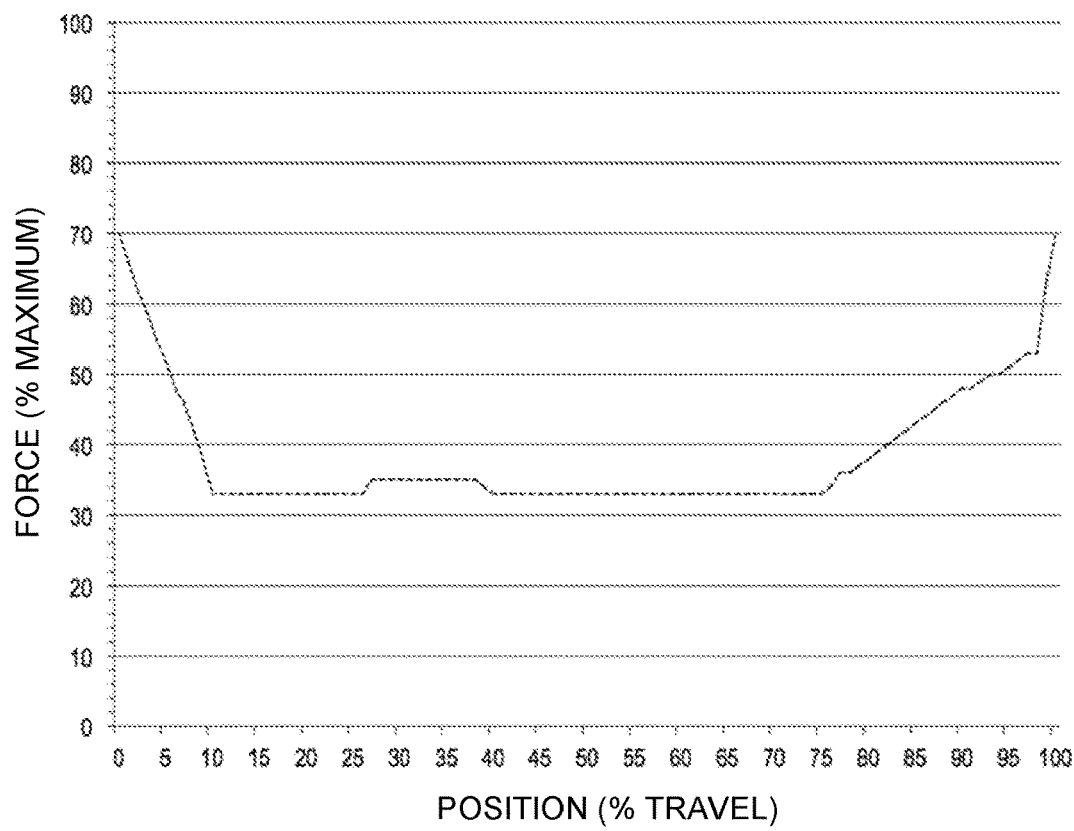
Figure 5C:
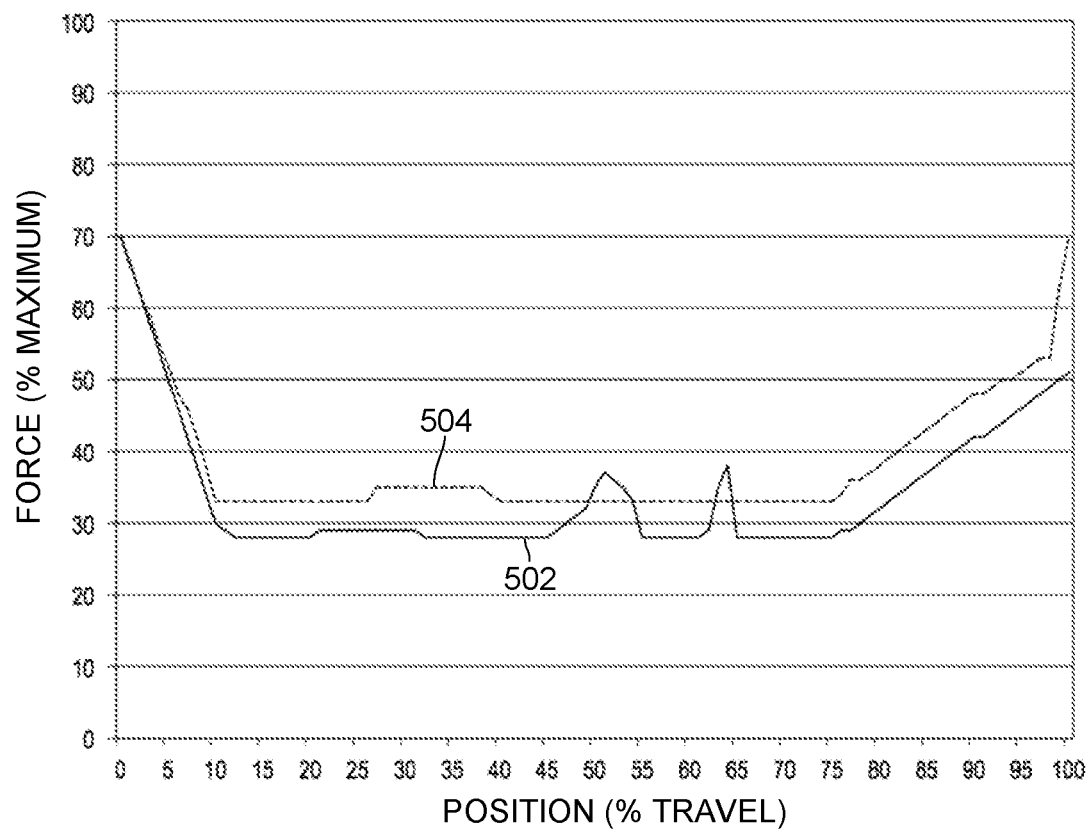

In embodiments, the process controller 32 may retrieve (or receive) data from the data structures (e.g., the data structures 400, 430) stored in the memory 19 of the actuator 16. The process controller 32 may analyze the retrieved data and/or may transmit the data to a data historian for archiving and/or to a workstation associated with the process control interface 38 for display to an operator, maintenance engineer, configuration engineer, etc. The process control interface 38 may execute one or more software applications operable to display the retrieved data as a graph depicting the high-force profile. FIGS. 5A to 5C depict example graphs of high-force profiles corresponding to the data in FIGS. 4B and 4C. FIG. 5A, for example, is a graph of the subset 432 of data corresponding to the force values at each position during opening, while FIG. 5B is a graph of the subset 434 of data corresponding to the force values at each position during closing. In embodiments, the one or more software applications executing on the process control interface 38 may overlay various datasets for comparison purposes. For example, FIG. 5C is a graph having two lines 502 and 504, corresponding respectively to the subsets 432 and 434 of data. Accordingly, the line 502 depicts the maximum force values recorded during opening of the valve 14, while the line 504 depicts the maximum force values recorded during closing of the valve 14. In embodiments, the high-force profiles may be shown concurrently with (i.e., may be overlaid on) other data such as FST or PST force data.

Figure 6:
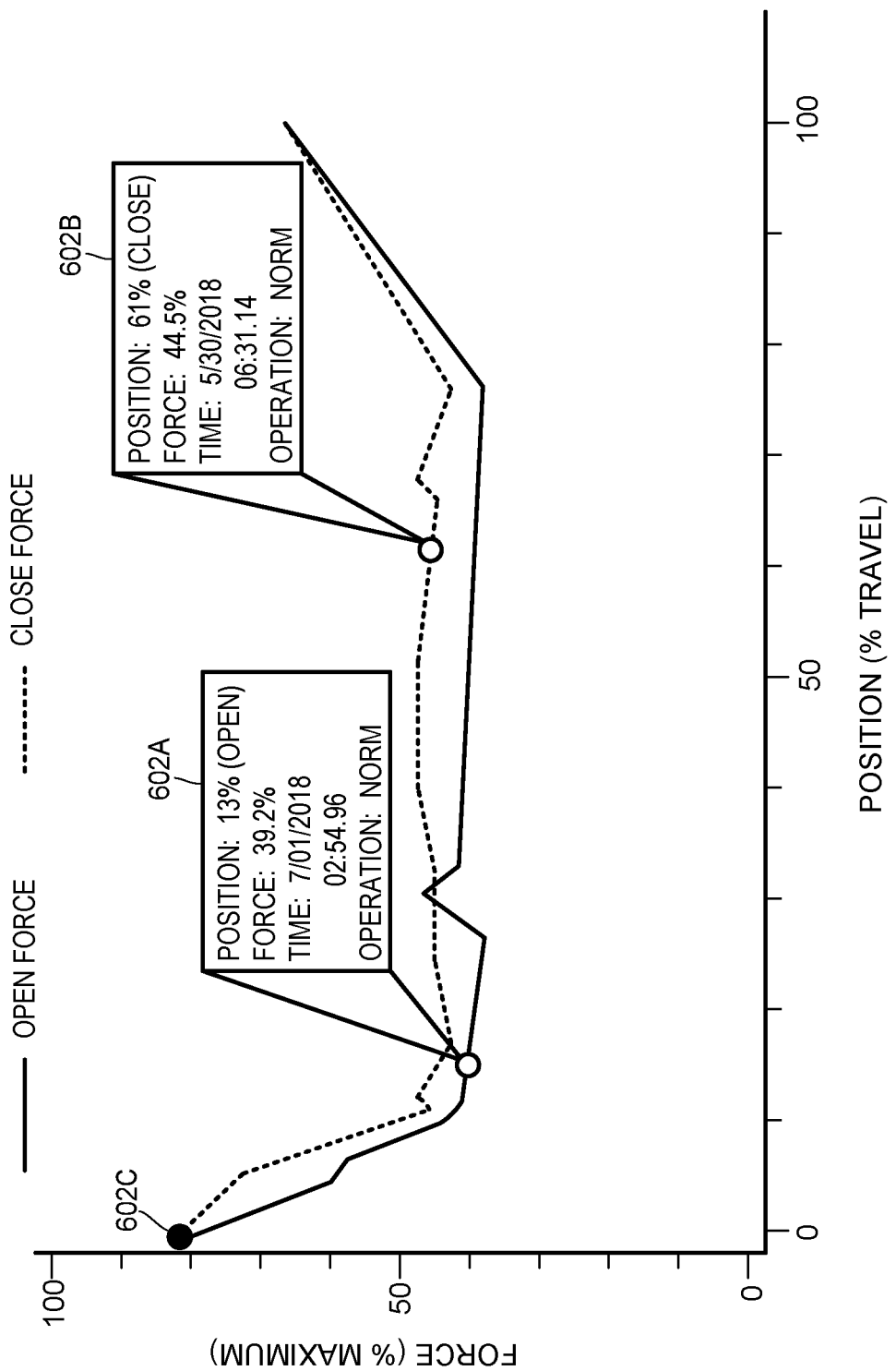
FIG. 6 depicts an additional example high-water force profile with additional data as may be displayed to a user.

FIG. 6 is a graphical depiction of a high force profile that may be generated, stored, and/or displayed for an actuator (e.g., the electric actuator 16 of FIG. 1), in accordance with some embodiments. The graphical depictions of FIG. 6 may be graphically displayed, for example, via a user interface device communicatively coupled to the actuator (e.g., the user process control interface 38 of FIG. 1). As in the graphical depictions in FIGS. 5A-5C, the high force profile in FIG. 6 may, for an electric actuator, be a "torque curve" including a plurality of actuator torque values (e.g., percentage of maximum rated torque) corresponding to respective position points (e.g., each 1% travel increment in each direction).

More particularly, FIG. 6 depicts an example high force profile that may be generated, stored, and/or displayed for the electric actuator. Because the high force profile may reflect the highest force values measured at the actuator across multiple operations (e.g., multiple tests and/or processes), some volatility in force values at adjacent position points may be expected. That is, large differences in actuator force at nearby position points may be more frequent. For example, if even just one operation of the actuator results in one measured spike in force value at 30% open position, the high force profile may include the spike at the same 30% open position.

Any force/position data point stored in the high force profile at the actuator 16 may include further information associated with the force/position data point, including the information described above. Such information may include, for example, the time at which the particular force/position data point was captured, the operation mode during which the data point was captured, etc. In embodiments, the software executing on the process control interface 38 may be capable of presenting this information, in addition to force/position data, with the graphical display of the high-force profile. With reference to FIG. 6, graphical overlays 602a-602b may be provided over a displayed profile (e.g., when a user hovers a mouse cursor over a particular point in the graphical depiction of the data), and the graphical overlays 602a-602b may provide further information associated with respective force/position data points. As can be observed from the overlays 602a-602b, any two force/position data points in the high force profile may be data points captured on different days, different times, different modes of operation, under different process environment conditions, etc.

In some embodiments, the high force profile may record a "peak force value" experienced at the actuator during operation at any position (e.g., any position in the open and/or closed directions). In FIG. 6, an example peak force value is indicated by an overlay 602c is indicated, with the peak force value being an actuator force value of 82% of the actuator's maximum rated force, as measured at 0% valve travel in the open and close directions.

After generating the high force profile, the actuator 16 may continue to monitor force values at the position points during any subsequent operation of the actuator 16. The actuator 16 may compare force values measured/recorded during subsequent operation to the previously recorded force values at corresponding position points. If a force value has been measured at a particular position point, and the measured force value exceeds the high force profile force value at the same position point, the actuator 16 may update the high force profile to reflect the determination.

Just as in some embodiments, the actuator 16 may additionally or alternatively store other measured information, such as peak/least voltage at the actuator 16, peak/least current draw at the actuator 16, peak/least temperature at the actuator 16, frequency of ONs and OFFs at the actuator 16, emergency stroke times in either the open or closed directions, and/or other measured or received information described in this detailed description, the one or more applications executing on the process control interface 38 may display those values with the force/position data and/or in separate displays.

Force Alert Configuration and Reporting Techniques

In some embodiments, the actuator 16 using the present techniques may be configured to generate and transmit alerts, alarms, or other reports based upon configured alert conditions. For instance, the processor 15 in the actuator 16 may execute one or more function blocks or control modules that evaluate the measured force values and, if they exceed a predetermined value, the processor 15 may send a signal to the process controller 32 to cause an alert or an alarm. In embodiments, a user may manually configure in the actuator 16 one or more alert conditions, such as alert rules, boundaries, and/or thresholds, via, e.g., the user interface device 38, and/or via a separate user interface device communicatively connected to the actuator 16. In embodiments, the thresholds may be compared to measured force value such that a force value that exceeds the threshold may generate an alert. In additional embodiments, the thresholds may be "delta" thresholds that apply to the magnitude of the change of a force value. For example, for a particular position, a threshold may be set that if the force value for the position changes by more than an amount or a percentage, an alert may be generated.

Based upon received alert and/or alarm signals received from the actuator 16, the process controller 32 may be configured to perform one or more remedial actions (e.g., adjusting a control parameter) in the process environment. Remedial actions may include, for example, transmitting a signal to one or more other process control devices, shutting down one or more process control devices, switching control actions to a redundant device, sending a maintenance alert, and/or other actions.

Figure 7:
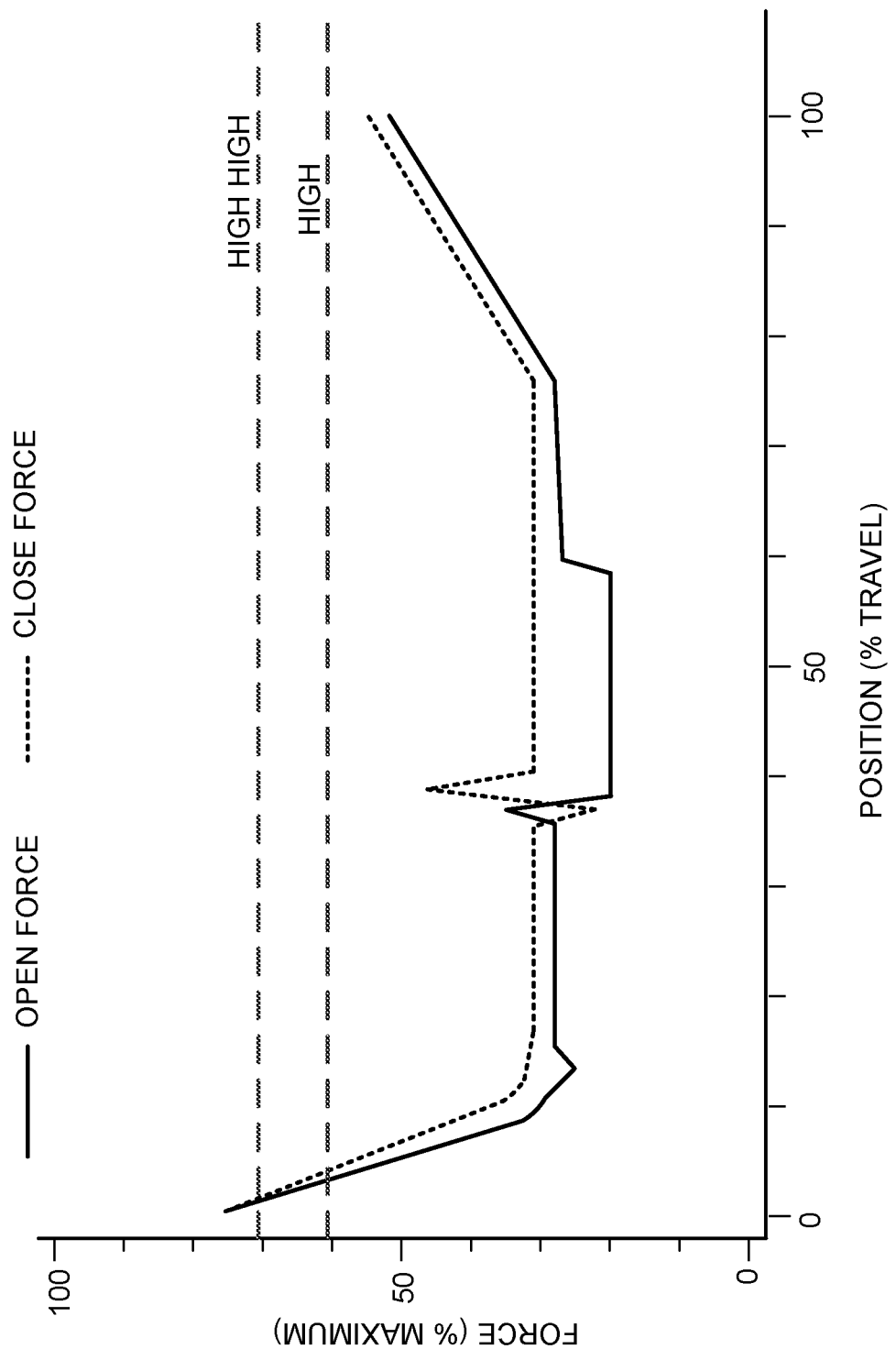
FIG. 7 depicts still another example high-water force profile with various thresholds as may be displayed to a user.

FIG. 7 depicts yet another example force curve. In FIG. 7 one or more dashed threshold lines represent one or more force alert boundaries that may be configured and stored at the actuator 16 (i.e., in the memory 19). In this example, three distinct thresholds (high, medium, and low) are set for both high and low values, with each of the thresholds corresponding to a range of actuator force values. Thus, any particular force/position data point may fall within one of (1) the high high range (e.g., 71%-100%), (2) the high range (61-70%), or (3) the normal range (28-60%). By way of example, for force values falling in the normal range, the actuator 16 may not send any alarm/alert signals to the process controller 32, while the actuator 16 may send an alert to the process controller 32 when it records a force value in the high range and may send an alarm to the process controller 32 when it records a force value in the high high range. These values are only exemplary, and other alert/alarm rules, boundaries, and/or thresholds are possible. Additionally, while depicted for force values, similar thresholds, alert/alarm rules, and the like, may also be implemented for other values monitored within the actuator 16, including temperature, voltage, current, etc.

While FIG. 7 depicts the force alert boundaries as being constant across all position points, the thresholds may vary based upon ranges of position points and/or travel direction in some embodiments. For example, different thresholds may be configured between 0% open travel and 10% open travel, between 10% open travel and 60% open travel, between 70% open travel and open 100% travel, between 100% close travel and 70% close travel, etc. Furthermore, in some embodiments, the actuator 16 may be configured such that one or more particular thresholds may only apply under particular circumstances (e.g., during a specific day, week, month, or season, ambient temperature, fluid density, fluid temperature, during execution of a particular test or process, etc.).

In some embodiments, the actuator 16 may execute in the processor 15 one or more function blocks or control modules configured to detect a stick-slip condition of the controlled valve. Stick-slip conditions may be indicated, for example, by a sudden spike and/or drop in measured force values at the actuator 16. In some embodiments, the actuator may be configured to generate and/or transmit to the process controller 32 a signal based upon (1) a measured magnitude of a detected stick-slip condition (e.g., force value difference between a peak and valley of the stick slip), (2) the number of detected stick-slip conditions in a particular force curve or during a particular duration of time, (3) the number of times a similar stick-slip condition occurs at similar positions in operation of a same actuator and/or valve, and/or (4) an increasing magnitude of a stick-slip condition across operation of the same actuator and/or valve.

The actuator using these techniques may thereby facilitate detection and/or prediction of potential issues in the actuator 16, in the controlled valve 14, and/or elsewhere in the process environment. Furthermore, because each recorded force/position data point at the actuator 16 may be associated with a variety of other recorded data (e.g., time, current, voltage, temperature, signal information, etc.), the actuator 16 may even more precisely determine causes of problems or potential problems in the process environment, thereby reducing device failure occurrences and process downtime.

In embodiments, alerts conditions may be configured based upon other data measured at and recorded by the actuator 16. Alert rules, boundaries, and/or thresholds may be configured, for example, to respond to a measured voltage at the actuator, current draw at the actuator, temperature at the actuator, frequency of starts, stops, and strokes at the actuator, on-demand or emergency stroke time, and/or other information collected by the actuator 16 as described herein.

In embodiments, a user (e.g., an operator, maintenance engineer, etc.) may reset a high force profile for an open direction of travel (e.g., 0% to 100% in the open direction), for the close direction of travel (e.g., 100% to 0% in the close direction), or in both directions. Additionally or alternatively, the process controller 32 may be configured to cause the actuator 16 to automatically reset high force profile data. Still additionally or alternatively, in some embodiments, the actuator 16 may be configured to automatically reset a high force profile at predetermined intervals (e.g., every three months), or when the actuator 16 is moved to a different location or implementation in the process plant. In embodiments, the high force profile is archived when the data is reset. The archived high force profile may be stored in the memory 19 of the actuator 16, may be transmitted to the process controller 32 for archiving, may be transmitted to an asset management system (AMS) for archiving, may be transmitted to a data historian for archiving, etc.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A method of monitoring actuator force at an actuator operating to adjust a valve, the method generating a high force profile comprising a force value for each of a plurality of valve element positions, the method comprising: continuously executing during operation of the actuator a routine comprising: receiving at a processor disposed in the actuator, from a position sensor, a current position value indicating the position of a valve element in the valve; receiving at the processor, from a force sensor, a current force value indicating the force applied by the actuator; retrieving, from a memory device coupled to the processor, a previous force value measured at the current position; comparing, in the processor, the current force value for the current position with the previous force value for the current position; and replacing the previous force value for the current position with the current force value for the current position in the memory device if the current force value for the current position exceeds the previous force value for the current position.

2. A method according to aspect 1, wherein the actuator comprises an electric actuator, and wherein the current force and the previous force each comprise a torque value.

3. A method according to aspect 2, wherein the torque value is measured as a percentage of a maximum rated torque value.

4. A method according to aspect 1, wherein the actuator comprises a pneumatic actuator, and wherein the current force and the previous force each comprise an actuator pressure value.

5. A method according to any one of aspects 1 to 4, wherein the plurality of valve element positions corresponds to 1% increments of travel from 0% travel to 100% travel in an open travel direction, and 1% increments of travel from 100% travel to 0% travel in a close travel direction.

6. A method according to any one of aspects 1 to 5, the routine further comprising storing with each stored force value a time stamp indicating a time at which the force value was received.

7. A method according to any one of aspects 1 to 6, further comprising displaying as the high force profile, on a display communicatively coupled to a process controller, the stored force values for each of the plurality of valve element positions.

8. A method according to any one of aspects 1 to 7, further comprising: transmitting to a process controller the stored force values for each of the plurality of valve element positions; analyzing, in the process controller, received force values to determine an over-torque condition, an under-torque condition, and/or a stick-slip condition.

9. A method according to aspect 8, further comprising generating an alert or alarm in response to detecting the over-torque condition, the under-torque condition, or the stick-slip condition.

10. A method according to any one of aspects 1 to 9, the routine further comprising comparing the current force value to a pre-determined threshold and generating an alert or alarm if the current force value exceeds the predetermined threshold.

11. A method according to aspect 10, wherein the predetermined threshold applies to all of the plurality of valve element positions.

12. A method according to aspect 10, wherein the predetermined threshold applies only to a subset of the plurality of valve element positions, and wherein a second predetermined threshold applies to a second subset of the plurality of valve element positions.

13. A method according to aspect 10, wherein the predetermined threshold is determined based on whether the actuator is opening the valve or closing the valve.

14. A method according to any one of aspects 10 to 13, wherein the predetermined threshold is determined according to time of day, day of week, week of year, month of year, ambient temperature, fluid density, and/or temperature of a fluid flowing through the valve.

15. A method according to any one of aspects 1 to 14, further comprising storing as a peak force value the highest force value detected at any of the plurality of valve element positions.

16. A method according to aspect 15, further comprising storing with the peak force value a time stamp indicating the day and time at which the peak force value was detected and/or the position of the valve element when the peak force value was detected.

17. A method according to any one of aspects 1 to 16, when executed for an electric actuator, the method further comprising detecting and storing a maximum voltage, a minimum voltage, or both.

18. A method according to aspect 17, wherein the maximum voltage, the minimum voltage, or both, is detected and stored for each of the plurality of valve element positions.

19. A method according to aspect 17, comprising storing a valve element position associated with the maximum voltage, a valve element position associated with the minimum voltage, or both.

20. A method according to any one of aspects 17 to 19, further comprising comparing the maximum voltage or the minimum voltage to a corresponding threshold and generating an alert or alarm if the maximum voltage exceeds the corresponding threshold or if the minimum voltage falls below the corresponding threshold.

21. A method according to any one of aspects 1 to 20, the method further comprising detecting and storing a maximum temperature, a minimum temperature, or both.

22. A method according to aspect 21, further comprising comparing the maximum temperature or the minimum temperature to a corresponding threshold and generating an alert if the maximum temperature exceeds the corresponding threshold or if the minimum temperature falls below the corresponding threshold.

23. A method according to any one of aspects 1 to 22, when executed for an electric actuator, the method further comprising detecting and storing a maximum current, a minimum current, or both.

24. A method according to aspect 23, wherein the maximum current, the minimum current, or both, is detected and stored for each of the plurality of valve element positions.

25. A method according to aspect 23, comprising storing a position associated with the maximum current, a position associated with the minimum current, or both.

26. A method according to any one of aspects 23 to 25, further comprising comparing the maximum current or the minimum current, to a corresponding threshold and generating an alert or alarm if the maximum current exceeds the corresponding threshold or if the minimum current falls below the corresponding threshold.

27. An actuator comprising: a position sensor sensing a position of a valve element and outputting a position value; a force sensor sensing a force applied by the actuator and outputting a force value; a processor communicatively coupled to the position sensor and the force sensor, and to a process controller, and receiving the position value from the position sensor and the force value from the force sensor; and a memory device storing computer-executable instructions that, when executed by the processor, cause the processor to repeatedly execute a routine comprising: receiving a position value from the position sensor, the position value indicating the current position of the valve element; receiving a current force value from the force sensor, the force value indicating the current force applied by the actuator; retrieving, from a location in the memory corresponding to the current position, a stored force value for the current position; comparing the current force value to the stored force value; replacing in the memory the stored force value with the current force value if the current force value exceeds the stored force value.

28. An actuator according to aspect 27, wherein the actuator comprises an electric actuator, and wherein the force sensor measures torque.

29. An actuator according to aspect 28, wherein the torque is measured as a percentage of a maximum rated torque.

30. An actuator according to aspect 27, wherein the actuator comprises a pneumatic actuator, and wherein the force sensor measures pressure.

31. An actuator according to any one of aspects 27 to 30, wherein a plurality of position points correspond to 1% increments of travel of the valve element from 0% travel to 100% travel in an open travel direction, and 1% increments of travel of the valve element from 100% travel to 0% travel in a close travel direction.

32. An actuator according to any one of aspects 27 to 31, wherein the computer-executable instructions further include instructions that, when executed by the processor, cause the processor to store with each stored force value a time stamp indicating a time at which the force value was sensed.

33. An actuator according to any one of aspects 27 to 32, wherein the non-transitory computer-executable instructions further include instructions that, when executed by the processor, cause the processor to transmit the stored force values for each of the valve element positions to a process controller.

34. An actuator according to any one of aspects 27 to 33, wherein the computer-readable instructions further include instructions that, when executed by the processor, cause the processor to analyze the stored force values to detect at least one of an over-torque condition, an under-torque condition, or a stick-slip condition.

35. An actuator according to aspect 34, wherein the computer-readable instructions further include instructions that, when executed by the processor, cause the processor to generate an alert or alarm in response to detecting the over-torque condition, the under-torque condition, or the stick-slip condition.

36. An actuator according to any one of aspects 27 to 35, wherein the memory device stores a threshold value and wherein the routine further comprises comparing the current force value to the threshold value and generating an alert or alarm if the current force value exceeds the threshold value.

37. An actuator according to aspect 36, wherein the threshold value applies to all positions of the valve element.

38. An actuator according to aspect 36, wherein the threshold value applies only to a subset of the positions of the valve element, and wherein a second predetermined threshold applies to a second subset of the positions of the valve element.

39. An actuator according to aspect 36, wherein the threshold value used in the comparison is determined based on whether the actuator is opening the valve or closing the valve.

40. An actuator according to any one of aspects 36 to 39, wherein the threshold value is determined according to the time of day, day of week, week of year, month of year, ambient temperature, fluid density, and/or temperature of a fluid flowing through the valve.

41. An actuator according to any one of aspects 27 to 40, wherein the computer-readable instructions further include instructions that, when executed by the processor, cause the processor to store as a peak force value a maximum force value of the stored force values.

42 An actuator according to aspect 41, wherein the computer-readable instructions further include instructions that, when executed by the processor, cause the processor to store with the peak force value a time stamp indicating the day and time at which the peak force value was detected and/or the position of the valve element when the peak force value was detected.

43. An actuator according to any one of aspects 27 to 42, wherein the actuator is an electric actuator, the actuator further comprising a voltage sensor, and wherein the computer-readable instructions further include instructions that, when executed by the processor, cause the processor to detect and store a maximum voltage, a minimum voltage, or both.

44. An actuator according to aspect 43, wherein the maximum voltage, the minimum voltage, or both, is detected and stored for each of the valve element positions.

45. An actuator according to aspect 43, wherein the computer-readable instructions further include instructions that, when executed by the processor, cause the processor to store a position associated with the maximum voltage, a position associated with the minimum voltage, or both.

46. An actuator according to any one of aspects 43 to 45, wherein the computer-readable instructions further include instructions that, when executed by the processor, cause the processor to compare the maximum voltage or the minimum voltage to a corresponding threshold and generate an alert or alarm if the maximum voltage exceeds the corresponding threshold or if the minimum voltage falls below the corresponding threshold.

47. An actuator according to any one of aspects 27 to 46, the actuator further comprising a temperature sensor and wherein the computer-readable instructions further include instructions that, when executed by the processor, cause the processor to store a maximum temperature, a minimum temperature, or both.

48. An actuator according to aspect 47, wherein the computer-readable instructions further include instructions that, when executed by the processor, cause the processor to compare the maximum temperature or the minimum temperature to a corresponding threshold and to generate an alert or alarm if the maximum temperature exceeds the corresponding threshold or if the minimum temperature falls below the corresponding threshold.

49. An actuator according to any one of aspects 27 to 48, wherein the actuator is an electric actuator comprising a current sensor, and wherein the computer-readable instructions further include instructions that, when executed by the processor, cause the processor to store a maximum current, a minimum current, or both.

50. An actuator according to aspect 49, wherein the computer-readable instructions further include instructions that, when executed by the processor, cause the processor to store the maximum current, the minimum current, or both, for each of the valve element positions.

51. An actuator according to aspect 49, wherein the computer-readable instructions further include instructions that, when executed by the processor, cause the processor to store a position associated with the maximum current, a position associated with the minimum current, or both.

52. An actuator according to any one of aspects 49 to 51, wherein the computer-readable instructions further include instructions that, when executed by the processor, cause the processor to compare the maximum current or the minimum current to a corresponding threshold and to generate an alert if the maximum current exceeds the corresponding threshold or if the minimum current falls below the corresponding threshold.

53. A process control system comprising: a valve; an actuator according to any one aspects 27 to 52; a process controller providing control signals to the actuator; and a workstation communicatively coupled to the process controller and configured to receive data from the process controller and display the data on a display device coupled to the workstation.

54. A process control system according to aspect 53, wherein the workstation is configured to: receive a plurality of force values stored in the actuator, the plurality of force values corresponding to a plurality maximum force values at a corresponding plurality of valve positions, and each of the force values representing a maximum force stored for a particular one of the valve positions; and display the plurality of force values as a force curve.

55. A process control system according to aspect 54, wherein the workstation is further configured to receive a second plurality of force values, each force value corresponding to a force recorded at a corresponding position during a partial stroke test of the valve or during a full stroke test of the valve, and to display as a second force curve the second plurality of force values.

56. A process control system according to any one of aspects 53 to 55, wherein the workstation is configured to receive a selection of one or more threshold values, and to cause the one or more threshold values to be transmitted to the actuator.

57. A process control system according to aspect 56, wherein the one or more threshold values comprise a maximum force threshold applicable over the entire range of valve positions.

58. A process control system according to aspect 56, wherein the one or more threshold values comprise a first maximum force threshold applicable over a first subset of valve positions and a second maximum force threshold applicable over a second subset of valve positions.

59. A process control system according to aspect 56, wherein the one or more threshold values comprise a first maximum force threshold applicable to valve positions when the valve in closing, and a second maximum force threshold applicable to valve positions when the valve is opening.

60. A process control system according to any one of aspects 56 to 59, wherein the one or more thresholds include multiple threshold levels for each of the valve positions.

The invention claimed is:

1. A method of monitoring actuator force at an actuator operating to adjust a valve, the method comprising:
    continuously executing, by a processor in the actuator and during operation of the actuator, a routine comprising:
        receiving from a position sensor a current position value indicating a position of a valve element in the valve;
        receiving from a force sensor a current force value indicating a force applied by the actuator;
        retrieving, from a memory device coupled to the processor, a previous force value measured at the current position;
        comparing, by the processor, the current force value for the current position with the previous force value for the current position;
        determining, based upon the comparison, that the current force value for the current position exceeds the previous force value for the current position; and
        replacing the previous force value for the current position with the current force value for the current position in the memory device in response to determining that the current force value for the current position exceeds the previous force value for the current position.

2. A method according to claim 1, wherein the current force and the previous force each comprise a torque value.

3. A method according to claim 1, wherein the current force and the previous force each comprise an actuator pressure value.

4. A method according to claim 1, the routine further comprising storing with each stored force value a time stamp indicating a time at which the force value was received.

5. A method according to claim 1, further comprising displaying a high force profile on a display communicatively coupled to a process controller, wherein the high force profile comprises the stored force values for each of the plurality of valve element positions.

6. A method according to claim 1, further comprising:
    transmitting to a process controller the stored force values for each of the plurality of valve element positions;
    analyzing, in the process controller, received force values to determine an over-torque condition, an under-torque condition, and/or a stick-slip condition.

7. A method according to claim 1, the routine further comprising comparing the current force value to a predetermined threshold and generating an alert or alarm if the current force value exceeds the predetermined threshold.

8. A method according to claim 1, further comprising storing as a peak force value the highest force value detected at any of the plurality of valve element positions.

9. A method according to claim 1, wherein the actuator is an electric actuator, the method further comprising detecting and storing a maximum voltage, a minimum voltage, or both.

10. A method according to claim 1, wherein the actuator is an electric actuator, the method further comprising detecting and storing a maximum current, a minimum current, or both.

11. A method according to claim 10, further comprising comparing the maximum current or the minimum current, to a corresponding threshold and generating an alert or alarm if the maximum current exceeds the corresponding threshold or if the minimum current falls below the corresponding threshold.

12. An actuator comprising:
a position sensor that is configured to measure a position of a valve element and to output a corresponding position value;
a force sensor that is configured to measure a force applied by the actuator and to output a corresponding force value;
a processor communicatively coupled to the position sensor and the force sensor; and
a memory device storing computer-executable instructions that, when executed by the processor, cause the processor to repeatedly execute a routine comprising:
receiving a position value from the position sensor, the position value indicating the current position of the valve element;
receiving a force value from the force sensor, the force value indicating the current force applied by the actuator;
retrieving, from a location in the memory corresponding to the current position, a stored force value for the current position;
comparing the current force value to the stored force value;
determining, based upon the comparison, that the current force value for the current position exceeds the previous force value for the current position; and
replacing in the memory the stored force value with the current force value in response to determining that the current force value exceeds the stored force value.

13. An actuator according to claim 12, wherein the force sensor is configured to measure a torque provided by the actuator.

14. An actuator according to claim 12, wherein the force sensor is configured to measure pressure.

15. An actuator according to claim 12, wherein a plurality of position points correspond to 1% increments of travel of the valve element from 0% travel to 100% travel in an open travel direction, and 1% increments of travel of the valve element from 100% travel to 0% travel in a close travel direction.

16. An actuator according to claim 12, wherein the computer-executable instructions further include instructions that, when executed by the processor, cause the processor to store with each stored force value a time stamp indicating a time at which the force value was sensed.

17. An actuator according to claim 12, wherein the computer-executable instructions further include instructions that, when executed by the processor, cause the processor to transmit the stored force values for each of the valve element positions to a process controller.

18. An actuator according to claim 12, wherein the computer-executable instructions further include instructions that, when executed by the processor, cause the processor to analyze the stored force values to detect at least one of an over-torque condition, an under-torque condition, or a stick-slip condition.

19. An actuator according to claim 12, wherein the memory device stores a threshold value and wherein the routine further comprises comparing the current force value to the threshold value and generating an alert or alarm if the current force value exceeds the threshold value.

20. A non-transitory, computer-readable medium storing machine-executable instructions that, when executed by a processor, repeatedly cause the processor to:
receive from a position sensor a current position value indicating a position of a valve element in a valve;
receive from a force sensor a current force value indicating a force applied by an actuator coupled to the valve;
retrieve, from a memory device coupled to the processor, a previous force value measured at the current position;
compare, by the processor, the current force value for the current position with the previous force value for the current position;
determine, based upon the comparison, that the current force value for the current position exceeds the previous force value for the current position; and
replace the previous force value for the current position with the current force value for the current position in the memory device in response to determining that the current force value for the current position exceeds the previous force value for the current position.

* * * * *

UNITED STATES PATENT AND TRADEMARK OFFICE
CERTIFICATE OF CORRECTION

PATENT NO. : 11,385,616 B2
APPLICATION NO. : 16/125160
DATED : July 12, 2022
INVENTOR(S) : Paul Walker et al.

It is certified that error appears in the above-identified patent and that said Letters Patent is hereby corrected as shown below:

In the Specification

At Column 2, Line 34, "analysis" should be -- analysis of --.

At Column 8, Line 27, "X %" should be -- X% --.

At Column 8, Line 29, "X %" should be -- X% --.

At Column 8, Line 37, "X %" should be -- X% --.

At Column 15, Line 8, "602c is indicated" should be -- 602c --.

Signed and Sealed this
Fourteenth Day of November, 2023

Katherine Kelly Vidal
*Director of the United States Patent and Trademark Office*